(12) United States Patent
Yamaguchi

(10) Patent No.: US 11,346,696 B2
(45) Date of Patent: May 31, 2022

(54) FLOW RATE MEASURING DEVICE

(71) Applicant: DENSO CORPORATION, Kariya (JP)

(72) Inventor: Junzo Yamaguchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/317,072

(22) Filed: May 11, 2021

(65) Prior Publication Data

US 2021/0262844 A1   Aug. 26, 2021

Related U.S. Application Data

(63) Continuation of application No. PCT/JP2019/037150, filed on Sep. 23, 2019.

(30) Foreign Application Priority Data

Nov. 15, 2018 (JP) .............................. JP2018-214812

(51) Int. Cl.
*G01F 1/692* (2006.01)
*G01F 1/684* (2006.01)
*G01F 1/69* (2006.01)

(52) U.S. Cl.
CPC .............. *G01F 1/692* (2013.01); *G01F 1/684* (2013.01); *G01F 1/69* (2013.01)

(58) Field of Classification Search
CPC .............. G01F 1/692; G01F 1/684; G01F 1/69
See application file for complete search history.

(56) References Cited

U.S. PATENT DOCUMENTS

| 4,478,077 A | 10/1984 | Bohrer et al. |
| 4,581,928 A | 4/1986 | Johnson |
| 4,825,693 A | 5/1989 | Bohrer et al. |
| 4,867,842 A | 9/1989 | Bohrer et al. |
| 2008/0289413 A1* | 11/2008 | Yamaguchi ............. G01F 1/692 73/204.26 |
| 2013/0199280 A1 | 8/2013 | Nakano et al. |

FOREIGN PATENT DOCUMENTS

| EP | 1484584 A2 * | 12/2004 | ............... G01F 7/00 |
| EP | 2233896 A1 * | 9/2010 | ............... G01F 5/00 |
| JP | 4-93768 | 3/1992 | |
| JP | 4-102023 | 4/1992 | |
| JP | 2010-107497 | 5/2010 | |

* cited by examiner

*Primary Examiner* — Ryan D Walsh
(74) *Attorney, Agent, or Firm* — Nixon & Vanderhye P.C.

(57) ABSTRACT

A sensor SA has a flow sensor that measures a flow rate of intake air in a measurement flow path. The flow sensor has a film-shaped sensor film portion overlapped on a substrate front surface of a sensor substrate. The sensor film portion has a heat generating resistor that heats the sensor film portion and a temperature measuring resistor that measures a temperature of the sensor film portion. The heat generating resistor and the temperature measuring resistor are arranged in a depth direction Z along the substrate front surface of the sensor substrate. A length dimension LM1 of an upstream temperature measuring resistor is equal to or larger than a length dimension LM2 of a downstream temperature measuring resistor.

10 Claims, 13 Drawing Sheets

US 11,346,696 B2

FLOW RATE MEASURING DEVICE

CROSS REFERENCE TO RELATED APPLICATION

The present application is a continuation application of International Patent Application No. PCT/JP2019/037150 filed on Sep. 23, 2019, which designated the U.S. and claims the benefit of priority from Japanese Patent Application No. 2018-214812 filed on Nov. 15, 2018. The entire disclosures of all of the above applications are incorporated herein by reference.

TECHNICAL FIELD

The present disclosure relates to a flow rate measuring device.

BACKGROUND

Conventionally, a thermal type flow rate measuring device includes a heating element and a temperature detector. In the flow rate measuring device, a flow rate of gas is measured by heating the heating element to raise a temperature around the heating element and detecting a change in a temperature distribution around the heating element with the temperature detector.

SUMMARY

According to an aspect of the present disclosure, a flow rate measuring device is configured to measure a flow rate of fluid. The device comprises: a measurement flow path configured to conduct the fluid therethrough; and a flow sensor configured to measure the flow rate of the fluid in the measurement flow path. The flow sensor includes a sensor substrate having one surface and a film-shaped sensor film portion overlaid on the one surface of the sensor substrate. The sensor film portion includes a heater portion configured to heat the sensor film portion and a temperature measurement portion arranged in the heater portion along the one surface and configured to measure a temperature of the sensor film portion.

BRIEF DESCRIPTION OF THE DRAWINGS

The above and other objects, features and advantages of the present invention will become more apparent from the following detailed description made with reference to the accompanying drawings. In the drawings.

DESCRIPTION

Figure 1:
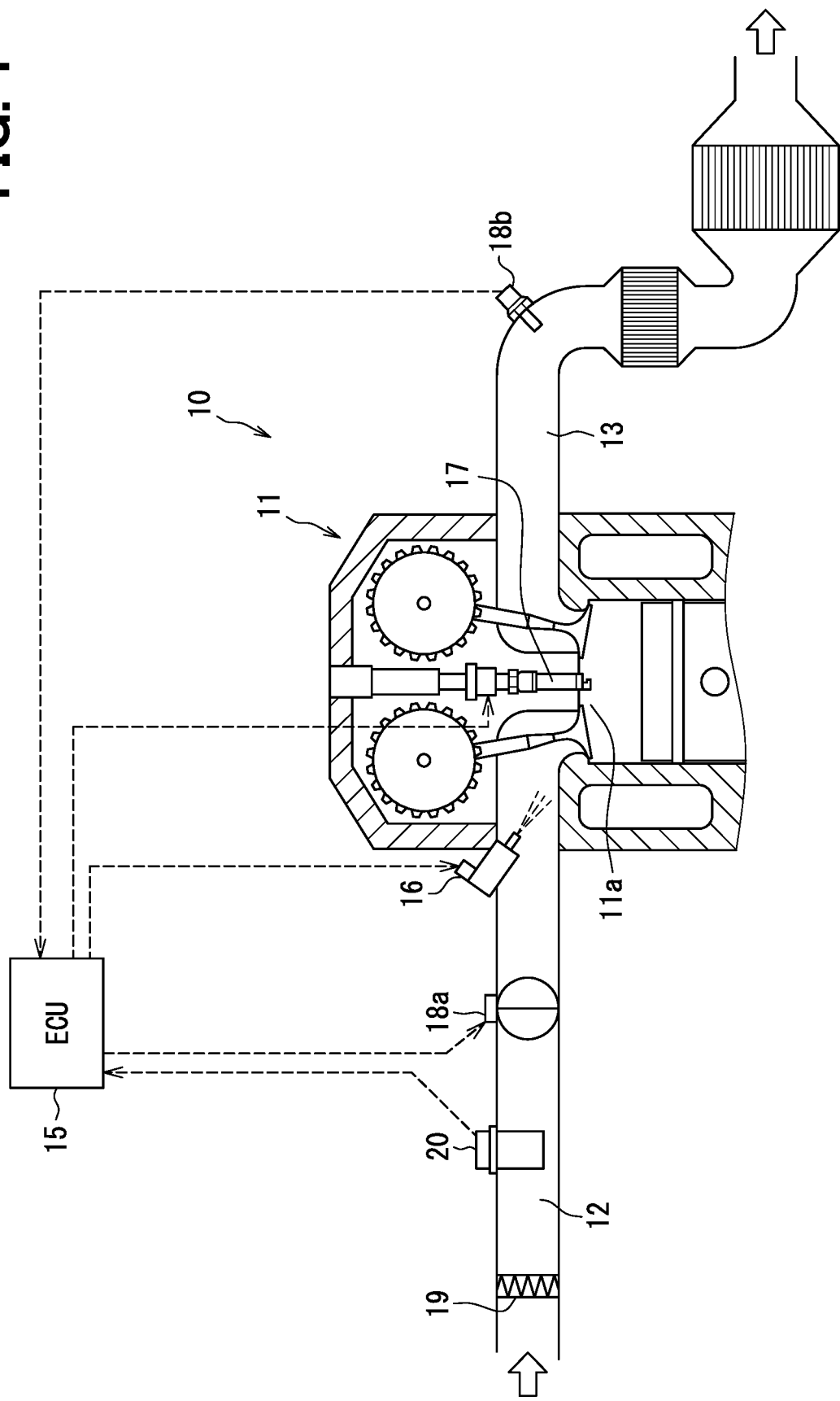
FIG. 1 is a view showing a configuration of a combustion system according to a first embodiment.

Hereinafter, examples of the present disclosure will be described.

According to an example of the present disclosure, a thermal type flow rate measuring device including a heating element and a temperature detector for measuring a flow rate of fluid. In the flow rate measuring device, a flow rate of gas is measured by heating the heating element to raise a temperature around the heating element and detecting a change in a temperature distribution around the heating element with the temperature detector.

According to an example of the present disclosure, the heating element and the temperature detector are provided side by side along a flow direction in which the gas flows. The heating element and the temperature detector are each formed in a rectangular shape and extend in an orthogonal direction orthogonal to the flow direction.

Here, when the heating element heats, it is considered that an aspect in which the heat from the heating element is transferred to the temperature detector differs depending on a size and shape of the temperature detector and a size and shape of the heating element. Therefore, depending on the size and shape of the temperature detector and the size and shape of the heating element, there is a concern that the temperature distribution around the heating element may not be appropriate for measuring the flow rate. In this case, a temperature measurement accuracy by the temperature measurement portion decreases, and as a result, a flow rate measurement accuracy by the flow rate measuring device decreases.

According to a first aspect of the present disclosure, a flow rate measuring device is configured to measure a flow rate of fluid. The device comprises: a measurement flow path configured to conduct the fluid therethrough; and a flow sensor configured to measure the flow rate of the fluid in the measurement flow path. The flow sensor includes a sensor substrate having one surface and a film-shaped sensor film portion overlaid on the one surface of the sensor substrate. The sensor film portion includes a heater portion configured to heat the sensor film portion and a temperature measurement portion arranged in the heater portion along the one surface and configured to measure a temperature of the sensor film portion. An orthogonal direction is orthogonal to both a thickness direction of the sensor film portion and an arrangement direction of the heater portion and the temperature measurement portion. A length dimension of the heater portion in the orthogonal direction is LH. A length dimension of an inner edge portion which is an edge portion of the temperature measurement portion on a heater portion side in the orthogonal direction is LM1. A length dimension of an outer edge portion which is an edge portion of the temperature measurement portion on a side opposite to the heater portion in the orthogonal direction, is LM2. A thickness dimension of the heater portion in the thickness direction is t1. Relationships of Expression 1 and Expression 2 are satisfied, $$240 < LH \times t1 \times (LM1 - LM2 + 1) < 2400, \text{ and} \qquad \text{Expression 1:}$$

$$LM1 \geq LM2. \qquad \text{Expression 2:}$$

In a configuration in which a sensor film portion of a flow sensor has a heater portion and a temperature measurement portion, the flow rate of fluid is measured by measuring the temperature distribution in the sensor film portion heated by the heater portion and changed by the flow rate of fluid by the temperature measurement portion. Therefore, when the temperature distribution in the sensor film portion is not in an appropriate aspect for temperature measurement, the measurement accuracy of the temperature measurement portion may decrease, and as a result, there is a concern that the measurement accuracy of the flow rate may decrease.

On the other hand, according to the first aspect, a relationship between the size and shape of the temperature measurement portion and the size of the heater portion in the flow sensor is defined by Expression 1 and Expression 2. In a configuration in which Expression 1 and Expression 2 are satisfied, the heater portion has an appropriate size which is neither too large nor too small for each length dimension of the inner edge portion and the outer edge portion of the temperature measurement portion. Therefore, when the sensor film portion is heated by the heater portion, the temperature distribution in the sensor film portion tends to be an appropriate aspect for the temperature measurement by the temperature measurement portion.

For example, it is possible to restrict that the heating responsiveness of the heater portion decreases since the heater portion is too large for the size and shape of the temperature measurement portion, and the temperature distribution in the sensor film portion is not in an appropriate aspect due to insufficient heating of the sensor film portion by the heater portion. In addition, it is possible to restrict that the sensitivity of the heater portion increases very much since the heater portion is too small for the size and shape of the temperature measurement portion, and the temperature distribution in the sensor film portion is not in an appropriate aspect since the sensor film portion is excessively heated by the heater portion.

As described above, by improving the measurement accuracy of the temperature measurement portion, it is possible to improve the measurement accuracy of the flow rate by the flow rate measuring device.

According to a second aspect of the present disclosure, a flow rate measuring device is configured to measure a flow rate of fluid. The flow rate measuring device comprises: a measurement flow path configured to conduct the fluid therethrough; and a flow sensor configured to measure the flow rate of the fluid in the measurement flow path. The flow sensor includes a sensor substrate having one surface; and a film-shaped sensor film portion overlaid on the one surface of the sensor substrate. The sensor film portion includes a heater portion configured to heat the sensor film portion; and a temperature measurement portion arranged in the heater portion along the one surface to measure a temperature of the sensor film portion. An orthogonal direction is orthogonal to both a thickness direction of the sensor film portion and an arrangement direction of the heater portion and the temperature measurement portion. In the orthogonal direction, a length dimension of an outer edge portion which is an edge portion of the temperature measurement portion on a side opposite to the heater portion is smaller than a length dimension of an inner edge portion which is an edge portion of the temperature measurement portion on a heater portion side. The outer edge portion is at a position spaced inwardly in the orthogonal direction from both end portions of the inner edge portion.

In the sensor film portion, it is considered that the heat generated in the heater portion is radially transferred from the heater portion. Therefore, when the temperature distribution in the sensor film portion is shown by, for example, an isotherm, it is assumed that the isotherm is circular or elliptical so as to surround the center of the heater portion. When the temperature measurement portion has a size or a shape that easily straddles the isotherm, a difference in temperature between portions of the temperature measurement portion, such as a central portion and an end portion, becomes large, and there is a concern that the temperature measurement accuracy by the temperature measurement portion may be decreased.

On the other hand, according to the second aspect, in the temperature measurement portion, the outer edge portion is provided at a position spaced inwardly in the orthogonal direction from the both end portion of the inner edge portion. In the configuration, since one end portion of each of the outer edge portion and inner edge portion is easily arranged along the isotherm, and another end portion of each of the outer edge portion and inner edge portion is easily arranged along the isotherm, it becomes difficult for the temperature measurement portion to straddle the isotherm. In this case, since the difference in temperature between the portions is unlikely to be large in the temperature measurement portion, the temperature measurement accuracy by the temperature measurement portion can be improved. As a result, the measurement accuracy of the flow rate by the flow rate measuring device can be improved.

Hereinafter, multiple embodiments of the present disclosure will be described with reference to the drawings. In addition, duplicate description may be omitted by assigning the same reference numerals to the corresponding components in each embodiment. When only a part of a configuration is described in each embodiment, a configuration of the other embodiment described above can be applied to the other parts of the configuration. Further, in addition to the combination of configurations specified in the description of each embodiment, as long as there is no particular problem in the combination, it is possible to partially combine configurations of multiple embodiments without specifying them. Further, the unspecified combination of the configurations described in multiple embodiments and modification examples is also described by the following description.

First Embodiment

The combustion system 10 shown in FIG. 1 includes an internal combustion engine 11 such as a gasoline engine, an intake passage 12, an exhaust passage 13, an air flow meter 20, and an ECU 15, and are mounted on, for example, a vehicle. The air flow meter 20 is provided in the intake passage 12 and measures physical quantities such as a flow rate, temperature, humidity, and pressure of intake air supplied to the internal combustion engine 11. The air flow meter 20 corresponds to a flow rate measuring device for measuring fluid such as intake air. The intake air is a gas supplied to a combustion chamber 11a of the internal combustion engine 11. In the combustion chamber 11a, an air-fuel mixture of intake air and a fuel is ignited by a spark plug 17.

The ECU (Engine Control Unit) 15 is a control device that controls an operation of the combustion system 10. The ECU 15 is an arithmetic processing circuit including a storage medium such as a processor, RAM, ROM, and flash memory, a microcomputer including an input-output unit, a power supply circuit, and the like. A sensor signal output from the air flow meter 20 and a sensor signal output from a large number of vehicle-mounted sensors are input to the ECU 15. The ECU 15 uses a measurement result of the air flow meter 20 to control an engine with respect to a fuel injection amount and an EGR amount of an injector 16. The ECU 15 is a control device that controls the operation of the internal combustion engine 11, and the combustion system 10 can also be referred to as an engine control system. In addition, the ECU 15 corresponds to an external device.

The combustion system 10 has multiple measuring units as the vehicle-mounted sensor. In addition to the air flow meter 20, the measuring unit includes a throttle sensor 18a, an air-fuel ratio sensor 18b, and the like. All of these measuring units are electrically connected to the ECU 15 and output a detection signal to the ECU 15. In the intake passage 12, the air flow meter 20 is provided downstream of the air cleaner 19 and upstream of a throttle valve to which the throttle sensor 18a is attached.

Figure 2:
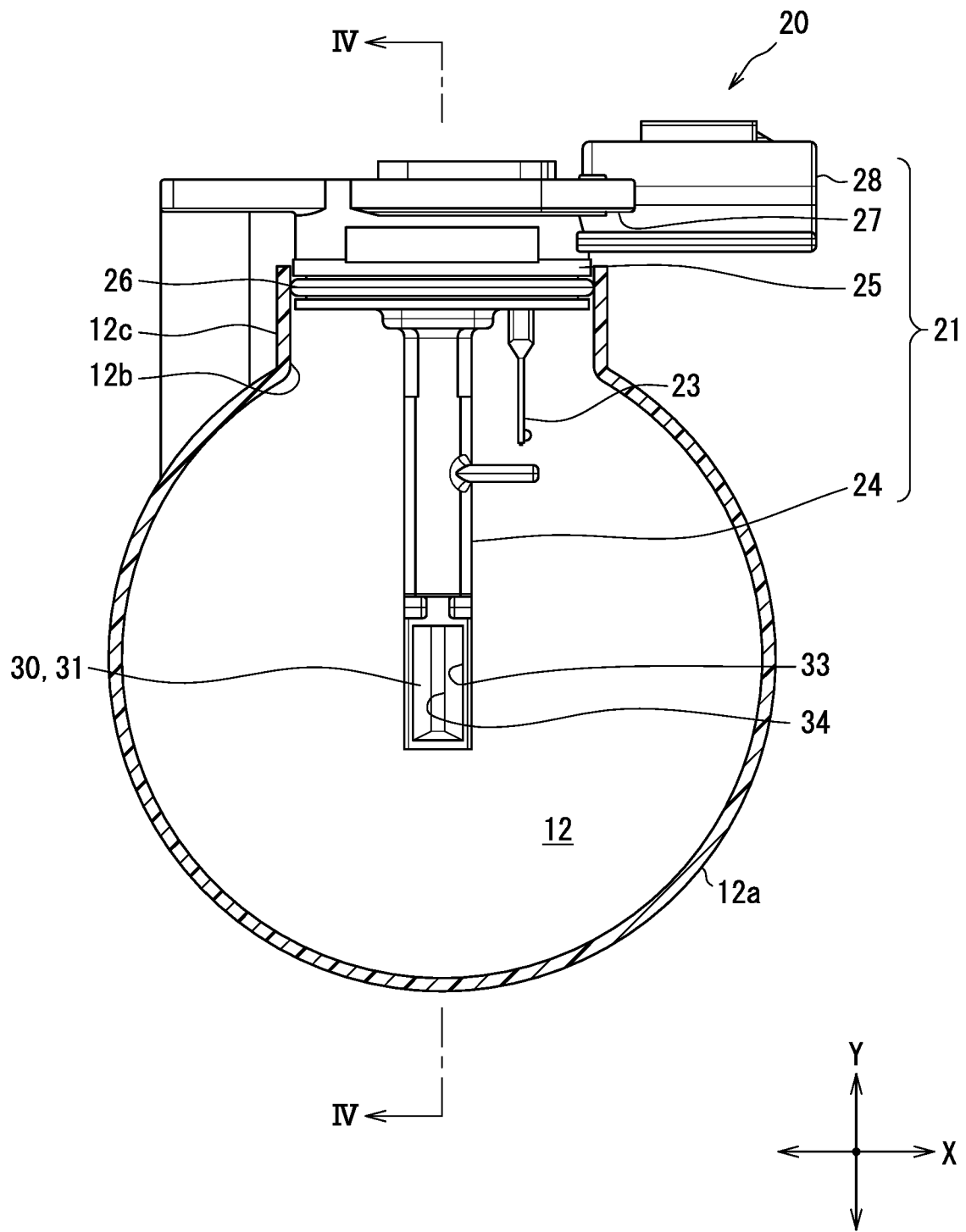
FIG. 2 is a front view of an air flow meter attached to an intake pipe.
Figure 4:
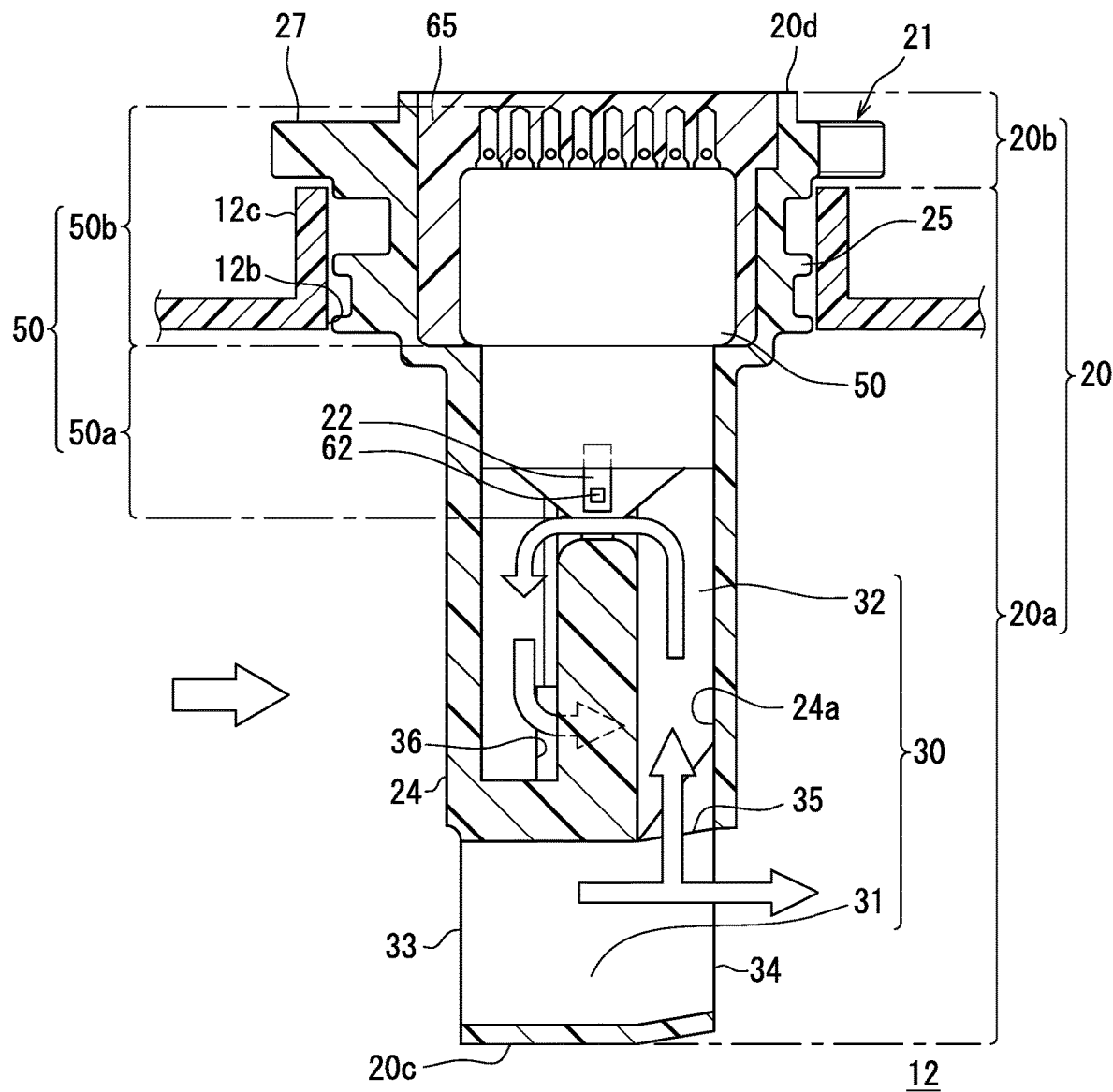
FIG. 4 is a sectional view taken along line IV-IV of FIG. 2.

As shown in FIGS. 2 and 4, the air flow meter 20 is attached to an intake pipe 12a such as a duct forming the intake passage 12. The intake pipe 12a is provided with an air flow insertion hole 12b as a through hole penetrating an outer peripheral portion thereof. An annular pipe flange 12c is attached to the air flow insertion hole 12b, and the pipe flange 12c is included in the intake pipe 12a. The air flow meter 20 is in a state of entering the intake passage 12 by being inserted into the pipe flange 12c and the air flow insertion hole 12b, and is fixed to the intake pipe 12a and the pipe flange 12c in this state.

In the present embodiment, a width direction X, a height direction Y, and a depth direction Z are set for the air flow meter 20, and these directions X, Y, and Z are orthogonal to each other. The air flow meter 20 extends in the height direction Y, and the intake passage 12 extends in the depth direction Z The air flow meter 20 has an entering portion 20a that enters the intake passage 12 and a protruding portion 20b that protrudes from the pipe flange 12c to the outside without entering the intake passage 12, and the entering portion 20a and the protruding portion 20b are arranged in the height direction Y. In the air flow meter 20, out of a pair of end surfaces 20c and 20d arranged in the height direction Y, the one included in the entering portion 20a is called an air flow front end surface 20c, and the one included in the protruding portion 20b is called an air flow base end surface 20d. The air flow front end surface 20c and the air flow base end surface 20d are orthogonal to the height direction Y. In addition, the front end surface of the pipe flange 12c is also orthogonal to the height direction Y.

Figure 3:
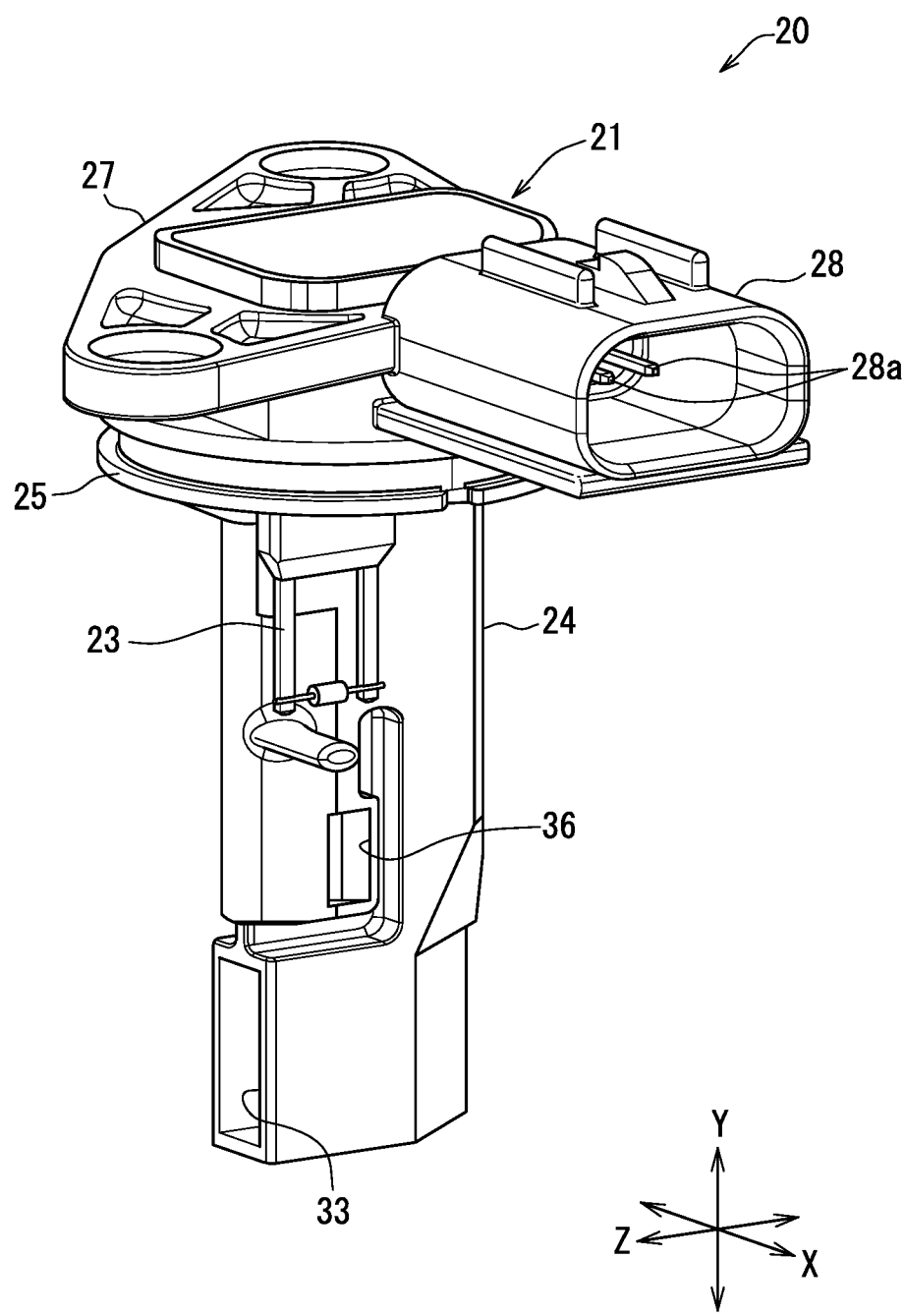
FIG. 3 is a perspective view of an air flow meter.

As shown in FIGS. 2, 3, and 4, the air flow meter 20 includes a housing 21, a flow sensor 22 for measuring the flow rate of intake air, and an intake air temperature sensor 23 for measuring the temperature of intake air. The housing 21 is provided with, for example, a resin material and the like. In the air flow meter 20, the housing 21 is attached to the intake pipe 12a so that the flow sensor 22 can come into contact with the intake air flowing through the intake passage 12. The housing 21 has a housing main body 24, a ring holding portion 25, a flange portion 27 and a connector portion 28, and an O-ring 26 is attached to the ring holding portion 25. In FIG. 4, the O-ring 26 is not shown.

The housing main body 24 is formed in a tubular shape as a whole, and in the housing 21, the ring holding portion 25, the flange portion 27, and the connector portion 28 are integrally provided on the housing main body 24. The ring holding portion 25 is included in the entering portion 20a, and the flange portion 27 and the connector portion 28 are included in the protruding portion 20b.

The ring holding portion 25 is provided inside the pipe flange 12c, and holds the O-ring 26 so as not to be displaced in the height direction Y. The O-ring 26 is a sealing member that seals the intake passage 12 inside the pipe flange 12c, and is in close contact with both the outer peripheral surface of the ring holding portion 25 and the inner peripheral surface of the pipe flange 12c. The flange portion 27 is provided with a fixing hole such as a screw hole for fixing a fixing tool such as screws for fixing the air flow meter 20 to the intake pipe 12a. The connector portion 28 is a protective portion that protects a connector terminal 28a which is electrically connected to the flow sensor 22.

The flow sensor 22 is provided in the internal space 24a of the housing main body 24, and the intake air temperature sensor 23 is provided on the outside of the housing 21. The intake air temperature sensor 23 has a temperature sensing element that senses the temperature of intake air, a lead wire extending from the temperature sensing element, and an intake air temperature terminal connected to the lead wire. The housing 21 has a support portion that supports the intake air temperature sensor 23, and the support portion is provided on the outer periphery side of the housing 21.

The housing main body 24 is provided with a bypass flow path 30 through which a part of the intake air flowing through the intake passage 12 flows. The bypass flow path 30 is disposed in the entering portion 20a of the air flow meter 20. The bypass flow path 30 has a passage flow path 31 and a measurement flow path 32, and the passage flow path 31 and the measurement flow path 32 are provided with an internal space 24a of the housing main body 24. The intake passage 12 may be referred to as a main passage, and the bypass flow path 30 may be referred to as a sub passage.

The passage flow path 31 penetrates the housing main body 24 in the depth direction Z. The passage flow path 31 has an inflow port 33 which is an upstream end portion thereof and an outflow port 34 which is a downstream end portion. The measurement flow path 32 is a branch flow path branched from an intermediate portion of the passage flow path 31, and the flow sensor 22 is provided in the measurement flow path 32. The measurement flow path 32 has a measuring inlet 35 which is an upstream end portion thereof and a measuring outlet 36 which is a downstream end portion thereof. A portion where the measurement flow path 32 branches from the passage flow path 31 is a boundary portion between the passage flow path 31 and the measurement flow path 32, and the measuring inlet 35 is included in the boundary portion. The measuring inlet 35 corresponds to a branch inlet, and the measuring outlet 36 corresponds to a branch outlet. In addition, the boundary portion between the passage flow path 31 and the measurement flow path 32 can also be referred to as a flow path boundary portion.

The flow sensor 22 is a thermal type flow rate measurement portion having a heater portion. The flow sensor 22 outputs a detection signal corresponding to the temperature change when the temperature changes due to the heat generated by the heater portion. The flow sensor 22 is a rectangular parallelepiped chip component, and the flow sensor 22 can also be referred to as a sensor chip. The flow sensor 22 can also be referred to as a physical quantity detecting portion that measures the flow rate of intake air as physical quantities of fluid.

The air flow meter 20 has a sensor sub-assembly configured by including a flow sensor 22, and the sensor sub-assembly is referred to as a sensor SA50. The sensor SA50 is housed in the internal space 24a of the housing main body 24. The sensor SA50 can also be referred to as a detection unit, a measurement unit, or a sensor package.

The sensor SA 50 has an entering portion 50a that enters the measurement flow path 32 in the internal space 24a, and a protruding portion 50b that protrudes from the measurement flow path 32 without entering the measurement flow path 32. The entering portion 50a and the protruding portion 50b are arranged in the height direction Y, and the flow sensor 22 is included in the entering portion 50a.

Figure 5:
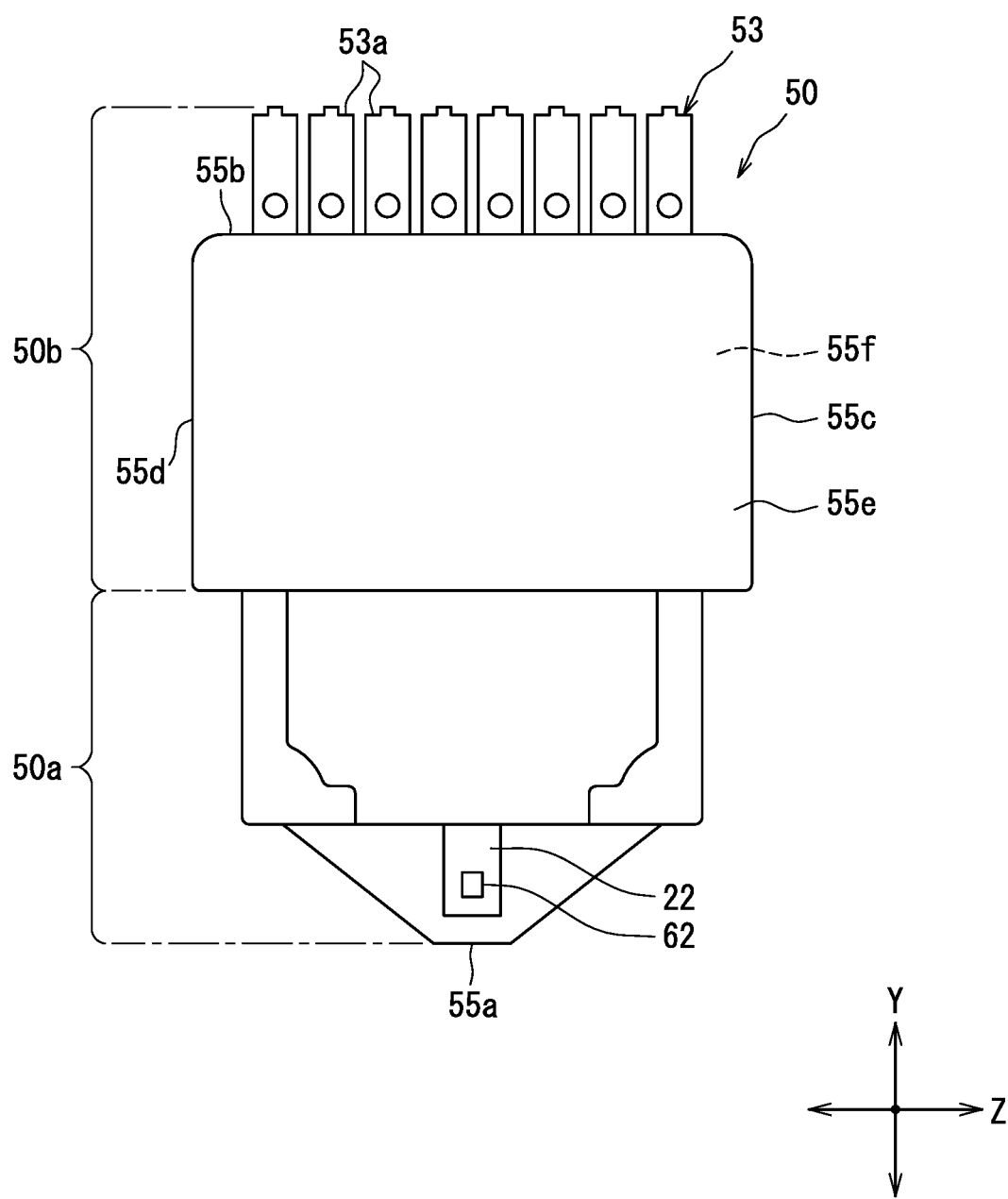
FIG. 5 is a view of a sensor SA as viewed from a front side.

As shown in FIG. 5, the sensor SA50 has an SA substrate 53 on which the flow sensor 22 is mounted, and a mold portion 55 that covers the flow sensor 22 and the SA substrate 53. The SA substrate 53 corresponds to a support plate portion, and the mold portion 55 corresponds to a body that protects the flow sensor 22. The SA substrate 53 can also be referred to as a lead frame.

The mold portion 55 is formed in a plate shape as a whole. In the mold portion 55, out of the pair of end surfaces 55a and 55b arranged in the height direction Y, the one included in the entering portion 50a is called a mold front end surface 55a, and the one included in the protruding portion 50b is called the mold base end surface 55b. In addition, one of the pair of surfaces provided with the mold front end surface 55a and the mold base end surface 55b interposed therebetween is referred to as a mold upstream surface 55c, and another surface is referred to as a mold downstream surface 55d. In FIG. 4, the sensor SA 50 is disposed in the internal space 24a in a direction in which the mold front end surface 55a is disposed on a side of the air flow front end surface 20c and the mold upstream surface 55c is disposed upstream of the measurement flow path 32 with respect to the mold downstream surface 55d.

The mold upstream surface 55c of the sensor SA50 is disposed upstream of the mold downstream surface 55d in the measurement flow path 32. In the portion of the measurement flow path 32 where the flow sensor 22 is provided, a direction of air flow is opposite to a direction of air flow in the intake passage 12. Therefore, the mold upstream surface 55c is disposed downstream of the mold downstream surface 55d in the intake passage 12. The air flowing along the flow sensor 22 flows in the depth direction Z, and the depth direction Z can also be referred to as a flow direction.

As shown in FIG. 5, in the sensor SA50, the flow sensor 22 is exposed on one surface of the sensor SA50. In the mold portion 55, a plate surface where the flow sensor 22 is exposed is referred to as a mold front surface 55e, and a plate surface on the opposite side is referred to as a mold back surface 55f. The SA substrate 53 is a conductive substrate that is formed in a plate shape as a whole with a metal material or the like. The plate surface of the SA substrate 53 is orthogonal to the width direction X and extends in the height direction Y and the depth direction Z The flow sensor 22 is mounted on the SA substrate 53. The SA substrate 53 is provided with a lead terminal 53a connected to the connector terminal 28a. The SA substrate 53 has a portion covered by the mold portion 55 and a portion not covered by the mold portion 55, and the portion not covered is the lead terminal 53a. The lead terminal 53a protrudes from the mold base end surface 55b in the height direction Y.

Figure 6:
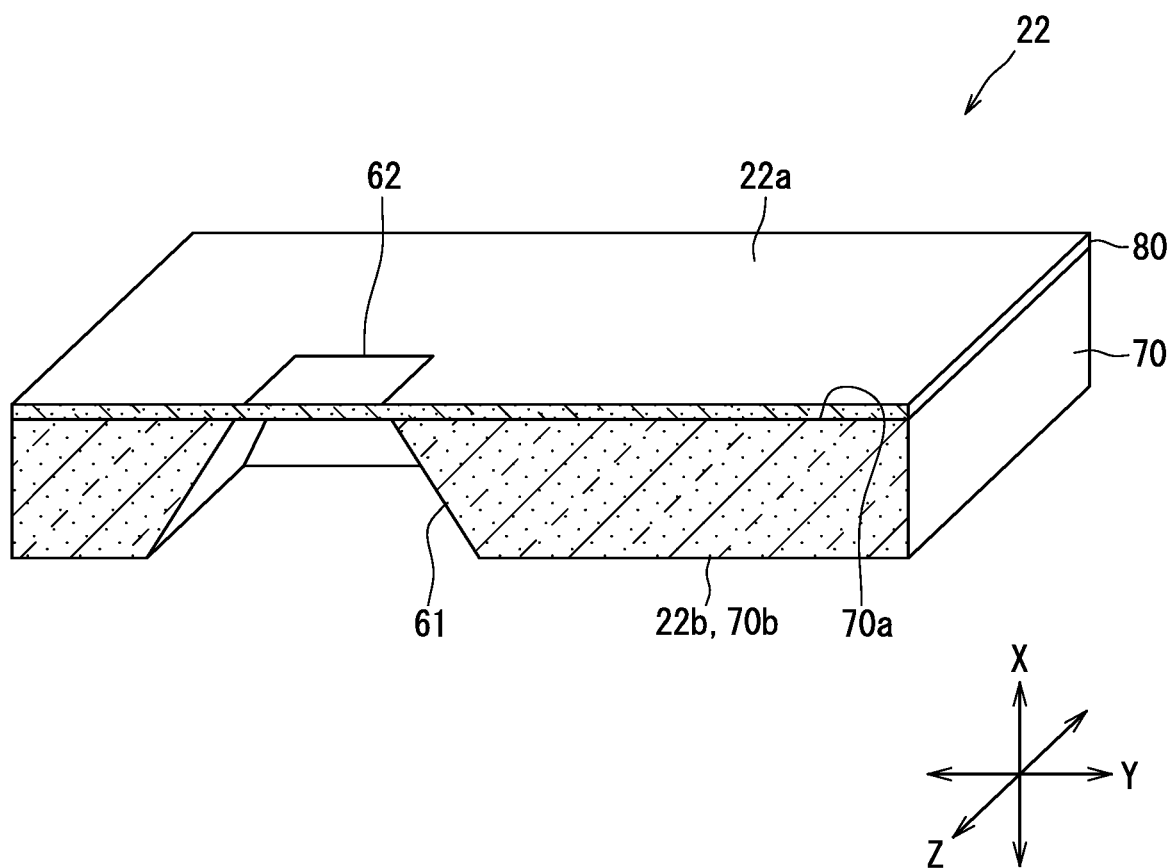
FIG. 6 is a cross-sectional perspective view of a flow sensor.

As shown in FIG. 6, the flow sensor 22 is formed in a plate shape as a whole. The flow sensor 22 has a sensor front surface 22a on one surface and a sensor back surface 22b opposite to the sensor front surface 22a. In the flow sensor 22, the sensor back surface 22b is overlapped with the SA substrate 53, and a part of the sensor front surface 22a is exposed to the outside of the sensor SA50.

The flow sensor 22 has a sensor recess portion 61 and a membrane portion 62. The sensor recess portion 61 is provided on the sensor back surface 22b, and the membrane portion 62 is provided on the sensor front surface 22a. The membrane portion 62 forms a bottom surface of the sensor recess portion 61. The portion of the membrane portion 62 that forms the bottom surface of the sensor recess portion 61 is the bottom portion for the sensor recess portion 61. The sensor recess portion 61 is provided by recessing the sensor back surface 22b toward the sensor front surface 22a. An opening portion of the sensor recess portion 61 is provided on the sensor back surface 22b. The membrane portion 62 is a sensing portion that senses the flow rate.

The flow sensor 22 has a sensor substrate 70 and a sensor film portion 80. The sensor substrate 70 is a base material of the flow sensor 22, and is formed in a plate shape by a semiconductor material such as silicon. The sensor substrate 70 has a substrate front surface 70a which is one surface and a substrate back surface 70b opposite to the substrate front surface 70a. The sensor substrate 70 is provided with a through hole that penetrates the sensor substrate 70 in the width direction X, and the sensor recess portion 61 is provided by the through hole. The sensor substrate 70 may be provided with a recess portion for forming the sensor recess portion 61 instead of the through hole. In this case, the bottom surface of the sensor recess portion 61 is not provided by the membrane portion 62, but is provided by the bottom surface of the recess portion of the sensor substrate 70.

The sensor film portion 80 is overlapped with the substrate front surface 70a of the sensor substrate 70, and extends in a film shape along the substrate front surface 70a. In the flow sensor 22, the sensor front surface 22a is provided by the sensor film portion 80, and the sensor back surface 22b is provided by the sensor substrate 70. In this case, the sensor back surface 22b is the substrate back surface 70b of the sensor substrate 70.

Figure 7:
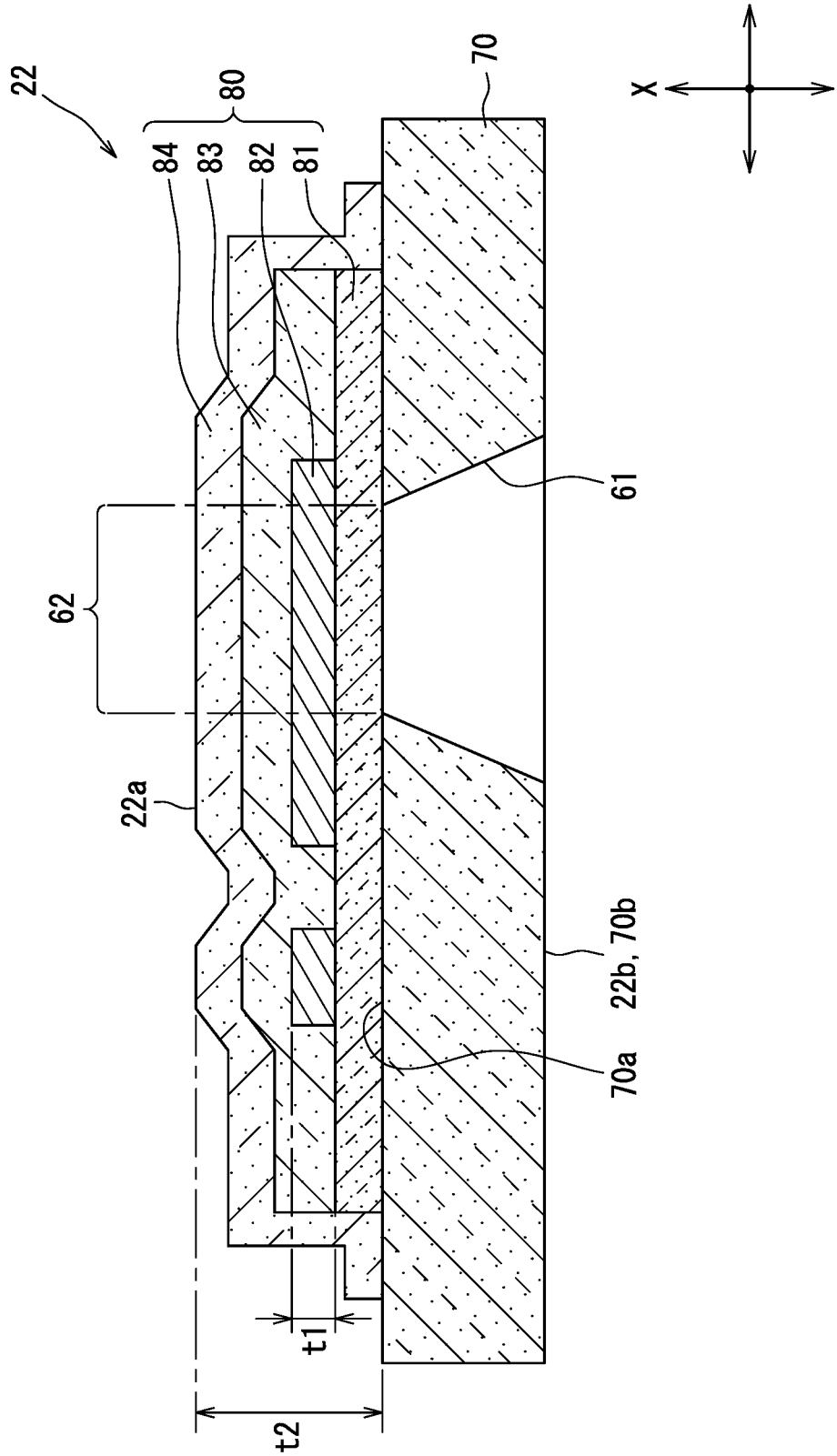
FIG. 7 is a vertical cross-sectional view of a flow sensor.

As shown in FIG. 7, the sensor film portion 80 has an insulating layer 81, a conductive layer 82, a protective layer 83, and a cover layer 84, and has a multi-layer structure. Each of these layers 81, 82, 83, and 84 is formed in a film shape and extends along the substrate front surface 70a.

The insulating layer 81 is provided in a film shape by a silicon oxide film, a silicon nitride film, or the like, and has an electrical insulating property. The insulating layer 81 is provided to contain at least one of silicon nitride and silicon oxide. The insulating layer 81 is overlapped on the substrate front surface 70a of the sensor substrate 70, and extends along the substrate front surface 70a.

The conductive layer 82 is formed in a film shape by a metal material or the like, and has conductivity. The conductive layer 82 is provided to include at least one of polycrystalline silicon, single crystal silicon, platinum, tungsten, copper, molybdenum, and nickel. The conductive layer 82 is provided on the side opposite to the sensor substrate 70 with the insulating layer 81 interposed therebetween, and extends along the insulating layer 81. The conductive layer 82 forms a wiring pattern such as a wiring or a resistor. The thermal conductivity of the conductive layer 82 is 60 [W/mK] or less. Regarding the thermal conductivity of the material forming the conductive layer 82, platinum Pt is, for example, 70 [W/mK], tungsten W is, for example, 173 [W/mK], molybdenum Mo is, for example, 138 [W/mK], and silicon Si is, for example, 150 [W/mK].

The protective layer 83 is formed in a film shape by a silicon oxide film, a silicon nitride film, or the like, and both extend along the substrate front surface 70*a*. The protective layer 83 is provided to contain at least one of silicon nitride and silicon oxide. The protective layer 83 has an electrical insulating property. In the protective layer 83, the protective layer 83 is provided on the side opposite to the insulating layer 81 with the conductive layer 82 interposed therebetween. The protective layer 83 is overlapped on the front surface of the conductive layer 82 and extends along the conductive layer 82.

The cover layer 84 is formed in a film shape by a silicon oxide film, a silicon nitride film, or the like, and both extend along the substrate front surface 70*a*. The cover layer 84 is provided to contain at least one of silicon nitride and silicon oxide. The cover layer 84 has an electrical insulating property. Out of the cover layer 84, a front cover layer 84 is provided on the side opposite to the conductive layer 82 with the protective layer 83 interposed therebetween. The front cover layer 84 is overlapped on the front surface of the protective layer 83 and extends along the protective layer 83.

Each thermal conductivity of the insulating layer 81, the protective layer 83, and the cover layer 84 is smaller than the thermal conductivity of the conductive layer 82. Specifically, each thermal conductivity of the insulating layer 81, the protective layer 83, and the cover layer 84 is smaller than ½ of the thermal conductivity of the conductive layer 82. Regarding the thermal conductivity of the materials forming the insulating layer 81, the protective layer 83, and the cover layer 84, the silicon oxide film $SiO_2$ is, for example, 1.5 [W/mK], and the silicon nitride film SiN is, for example, 3 to 20 [W/mK]. The insulating layer 81, the protective layer 83, and the cover layer 84 include a film base portion that forms both the front surface and the back surface of the sensor film portion 80. In this case, the sensor film portion 80 has the film base portion and the conductive layer 82, and in the sensor film portion 80, the film base portion covers the conductive layer 82. The film base portion of the present embodiment has a three-layer structure as a multi-layer structure.

In the flow sensor 22, the sensor recess portion 61 is provided by processing a part of the sensor substrate 70 by wet etching. In a manufacturing process of the flow sensor 22, a mask such as a silicon nitride film is attached to the substrate back surface 70*b* of the sensor substrate 70, and anisotropic etching is performed on the substrate back surface 70*b* until the sensor film portion 80 is exposed by using an etching solution. The sensor recess portion 61 may be provided by performing dry etching on the sensor substrate 70.

Figure 8:
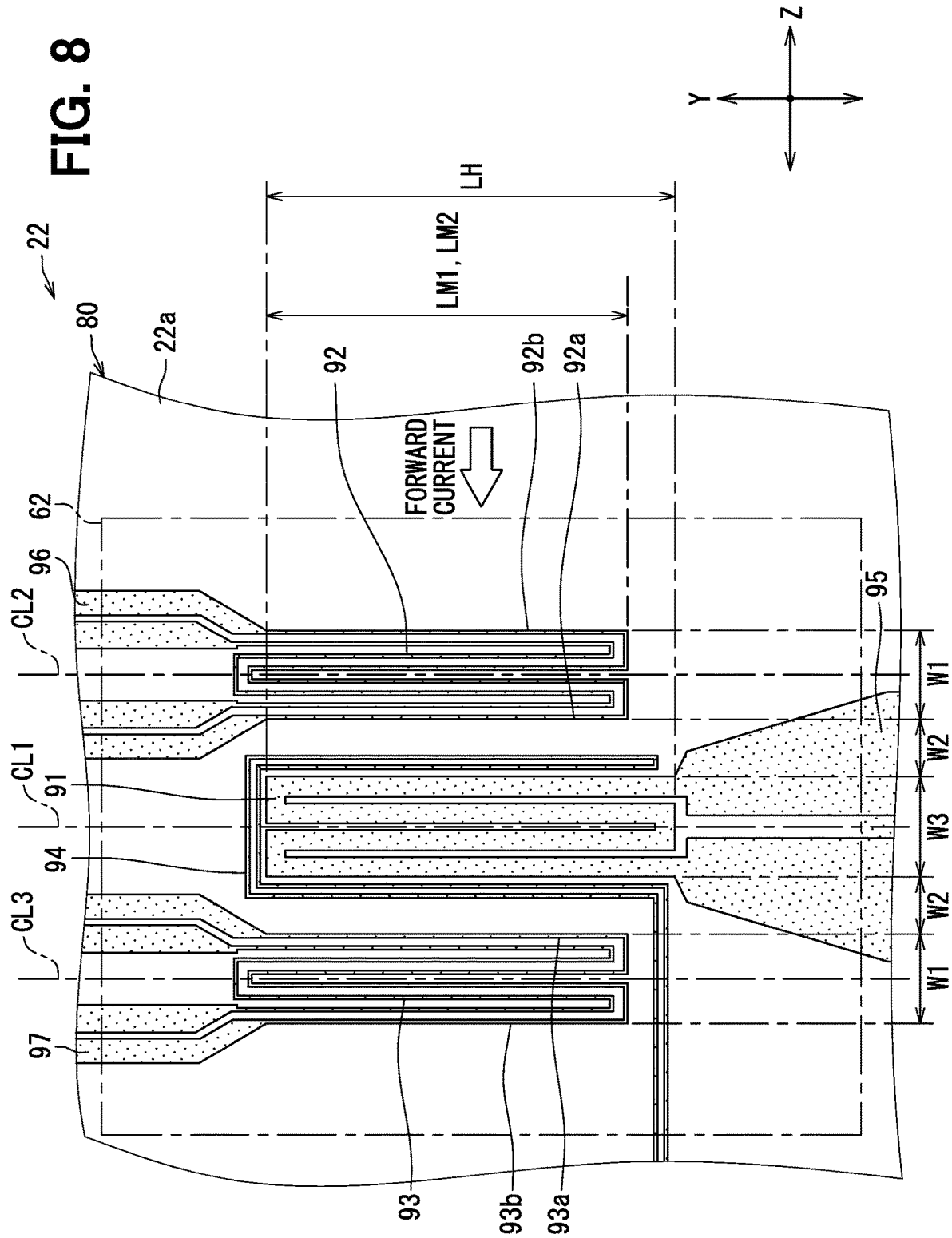
FIG. 8 is a view showing a wiring pattern in a membrane portion.

The sensor SA50 has a flow rate measurement circuit that measures the flow rate of air, and at least a part of the flow rate measurement circuit is included in the flow sensor 22. As shown in FIG. 8, the sensor SA50 has a heat generating resistor 91, temperature measuring resistors 92 and 93, and an indirect thermal resistor 94 as a circuit element included in the flow rate measurement circuit. These resistors 91 to 94 are included in the flow sensor 22 and are provided by the conductive layer 82 of the sensor film portion 80. In this case, the sensor film portion 80 has resistors 91 to 94, and these resistors 91 to 94 are included in the wiring pattern of the conductive layer 82. In FIG. 8, the wiring pattern including the resistors 91 to 94 is shown by dot hatching. In addition, the flow rate measurement circuit can also be referred to as a flow rate measuring unit that measures the flow rate of air.

The heat generating resistor 91 is a resistance element that generates heat when the heat generating resistor 91 is energized. The heat generating resistor 91 heats the sensor film portion 80 by generating heat, and corresponds to a heater portion. The temperature measuring resistors 92 and 93 are resistance elements for measuring the temperature of the sensor film portion 80, and correspond to the temperature measurement portion. A resistance value of the temperature measuring resistors 92 and 93 change according to the temperature of the sensor film portion 80. In the flow rate measurement circuit, the temperature of the sensor film portion 80 is measured using the resistance values of the temperature measuring resistors 92 and 93. The flow rate measurement circuit raises the temperature of the sensor film portion 80 and the temperature measuring resistors 92 and 93 by the heat generating resistor 91, and when an air flow occurs in the measurement flow path 32, the flow rate measurement circuit measures the air flow rate and the direction of the flow by using the change aspect of the measured temperature by the temperature measuring resistors 92 and 93.

The heat generating resistor 91 is disposed substantially in the center of the membrane portion 62 in each of the height direction Y and the depth direction Z The heat generating resistor 91 is formed in a rectangular shape extending in the height direction Y as a whole. A center line CL1 of the heat generating resistor 91 passes through the center of the heat generating resistor 91 and extends in the height direction Y. The center line CL1 passes through the center of the membrane portion 62. The heat generating resistor 91 is disposed at a position spaced inwardly from a peripheral edge portion of the membrane portion 62. The thermal conductivity of the heat generating resistor 91 is 60 [W/mK] or less in bulk.

The temperature measuring resistors 92 and 93 are all formed in a rectangular shape extending in the height direction Y as a whole, and are arranged in the depth direction Z. The heat generating resistor 91 is provided between the temperature measuring resistors 92 and 93. Out of the temperature measuring resistors 92 and 93, an upstream temperature measuring resistor 92 is provided at a position spaced from the heat generating resistor 91 upstream of the mold. A downstream temperature measuring resistor 93 is provided at a position spaced from the heat generating resistor 91 downstream of the mold. A center line CL2 of the upstream temperature measuring resistor 92 and a center line CL3 of the downstream temperature measuring resistor 93 both extend parallel to the center line CL1 of the heat generating resistor 91. In addition, a center line passing through the center of the upstream temperature measuring resistor 92 and extending in the depth direction Z is coincident with the center line passing through the center of the downstream temperature measuring resistor 93 and extending in the depth direction Z. That is, the center of the upstream temperature measuring resistor 92 and the center of the downstream temperature measuring resistor 93 are disposed at positions aligned in the height direction Y.

The heat generating resistor 91 is provided at an intermediate position between the upstream temperature measuring resistor 92 and the downstream temperature measuring resistor 93 in the depth direction Z In this case, a space distance between the center line CL1 and the center line CL2 and a space distance between the center line CL1 and the center line CL3 are the same. In the present embodiment, in the sensor SA50, a side of the mold upstream surface 55c (refer to FIG. 5) is referred to as a side of the mold upstream, and a side of the mold downstream surface 55d (refer to FIG. 5) is referred to as a side of the mold downstream.

The heat generating resistor 91 does not protrude from the temperature measuring resistors 92 and 93 toward the mold base end in the height direction Y, but protrudes toward the mold front end. In this case, the heat generating resistor 91 is disposed at a position shifted to the side of the mold front end with respect to the temperature measuring resistors 92 and 93. In the present embodiment, a side of the mold front end surface 55a (refer to FIG. 5) side is referred to as a side of the mold front end, and a side of the mold base end surface 55b (refer to FIG. 5) is referred to as a side of the mold base end.

The indirect thermal resistor 94 is a resistance element for measuring the temperature of the heat generating resistor 91. The indirect thermal resistor 94 extends along the peripheral edge portion of the heat generating resistor 91. The resistance value of the indirect thermal resistor 94 changes according to the temperature of the heat generating resistor 91. In the flow rate measurement circuit, the temperature of the heat generating resistor 91 is measured by using the resistance value of the indirect thermal resistor 94.

The sensor SA50 has a heat generating wiring 95 and temperature measuring wirings 96 and 97. These wirings 95 to 97 are included in the wiring pattern of the sensor film portion 80, similarly to the resistors 91 to 94. The heat generating wiring 95 extends from the heat generating resistor 91 toward the mold front end in the height direction Y. The upstream temperature measuring wiring 96 extends from the upstream temperature measuring resistor 92 toward the mold base end in the height direction Y. The downstream temperature measuring wiring 97 extends from the downstream temperature measuring resistor 93 toward the mold base end in the height direction Y.

In the temperature measuring resistors 92 and 93, when the edge portions on a side of the heat generating resistor 91 are referred to as inner edge portions 92a and 93a, and the edge portions on a side opposite to the heat generating resistor 91 are referred to as outer edge portions 92b and 93b, these edge portions 92a, 93a, 92b, and 93b have the same length. Specifically, in the height direction Y, a length dimension LM1 of the inner edge portions 92a and 93a and a length dimension LM2 of the outer edge portions 92b and 93b have the same value. On the other hand, in the height direction Y, the length dimension LH of the heat generating resistor 91 is larger than the length dimensions LM1 and LM2. The inner edge portion 92a of the upstream temperature measuring resistor 92 and the inner edge portion 93a of the downstream temperature measuring resistor 93 have the same dimension as each other in the length dimension LM1. In addition, the outer edge portion 92b of the upstream temperature measuring resistor 92 and the outer edge portion 93b of the downstream temperature measuring resistor 93 have the same dimension as each other in the length dimension LM2.

In the depth direction Z, a space distance W2 between the heat generating resistor 91 and the temperature measuring resistors 92 and 93 is smaller than a width dimension W1 of the temperature measuring resistors 92 and 93. The upstream temperature measuring resistor 92 and the downstream temperature measuring resistor 93 have the same width dimension as each other in the width dimension W1. In addition, the upstream temperature measuring resistor 92 and the downstream temperature measuring resistor 93 have the same space distance from the heat generating resistor 91 at the space distance W2. In the depth direction Z, the width dimension W3 of the heat generating resistor 91 is larger than the width dimension W1 of the temperature measuring resistors 92 and 93.

As shown in FIG. 7, in the width direction X, the thickness dimension t1 of the conductive layer 82 is smaller than the thickness dimension t2 of the sensor film portion 80. Specifically, the thickness dimension t1 is smaller than ½ of the thickness dimension t2. In addition, the thickness dimension t1 is smaller than ½ of a value obtained by subtracting the thickness dimension t1 from the thickness dimension t2. Further, the thickness dimension t1 is smaller than any of the width dimensions W1 and W3 and the space distance W2. In the sensor film portion 80, the thickness dimension of the thickest portion is set to the thickness dimension t2. Each of the resistors 91 to 94 has the same thickness dimension as each other in the thickness dimension t1. Furthermore, also in each of the resistors 91 to 94, the thickness dimension of the thickest portion is set to the thickness dimension t1.

In the flow sensor 22, the width direction X corresponds to the thickness direction, the height direction Y corresponds to the orthogonal direction, and the depth direction Z corresponds to the arrangement direction.

Figure 9:
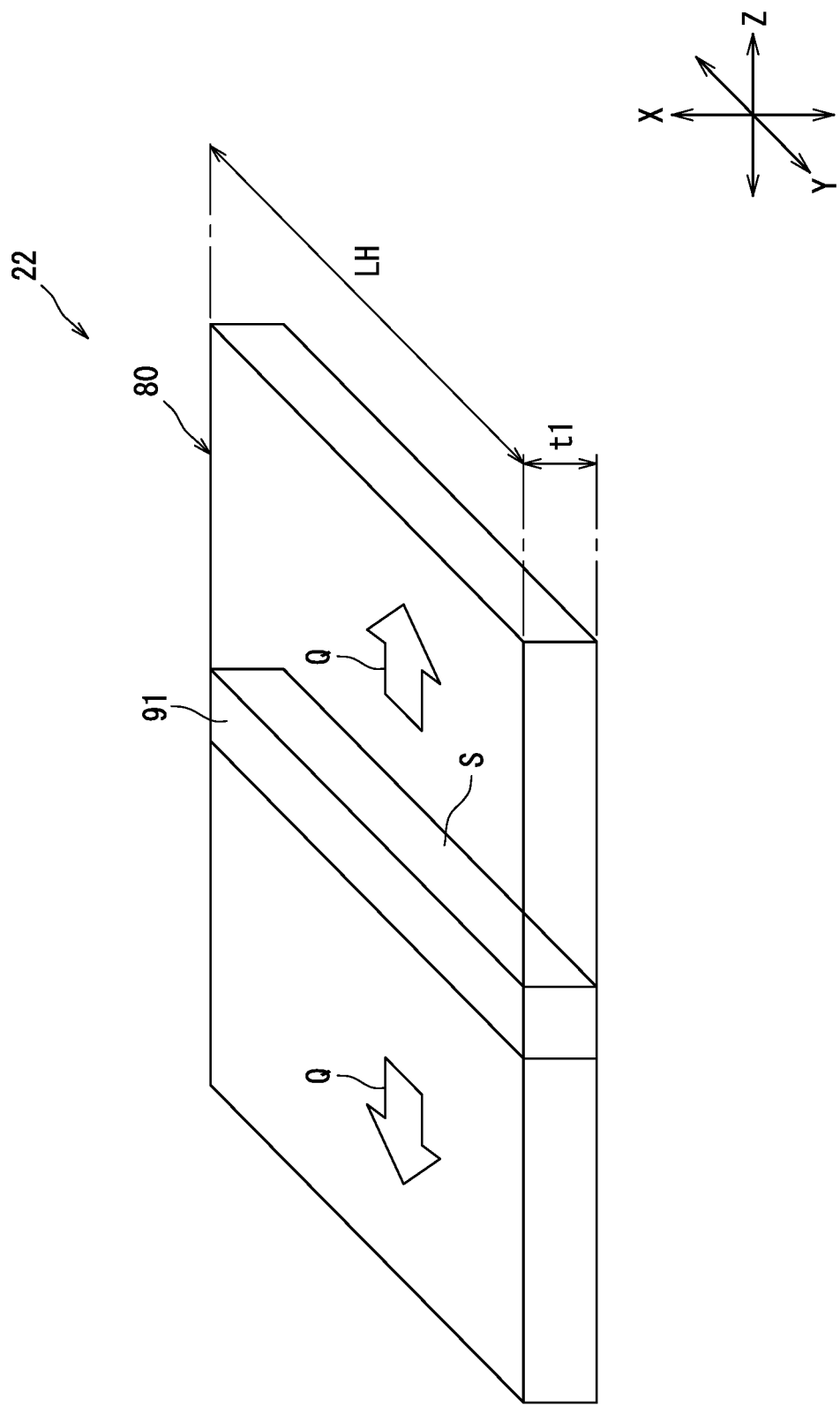
FIG. 9 is a view for explaining heat release from a heat generating resistor.

In FIG. 9, in the heat generating resistor 91, a cross-sectional area S in a direction orthogonal to the depth direction Z is a product of the length dimension LH and the thickness dimension t1. That is, a relationship S=LH×t1 is established. A amount Q of heat generated from the heat generating resistor 91 increases as the cross-sectional area S increases. Further, since the thickness dimension t2 of the sensor film portion 80 increases as the thickness dimension t1 of the heat generating resistor 91 increases, even when the amount of heat Q increases due to the larger cross-sectional area S, if the thickness dimension t2 of the sensor film portion 80 increases too much, the heat is hardly transmitted through the sensor film portion 80.

Figure 10:
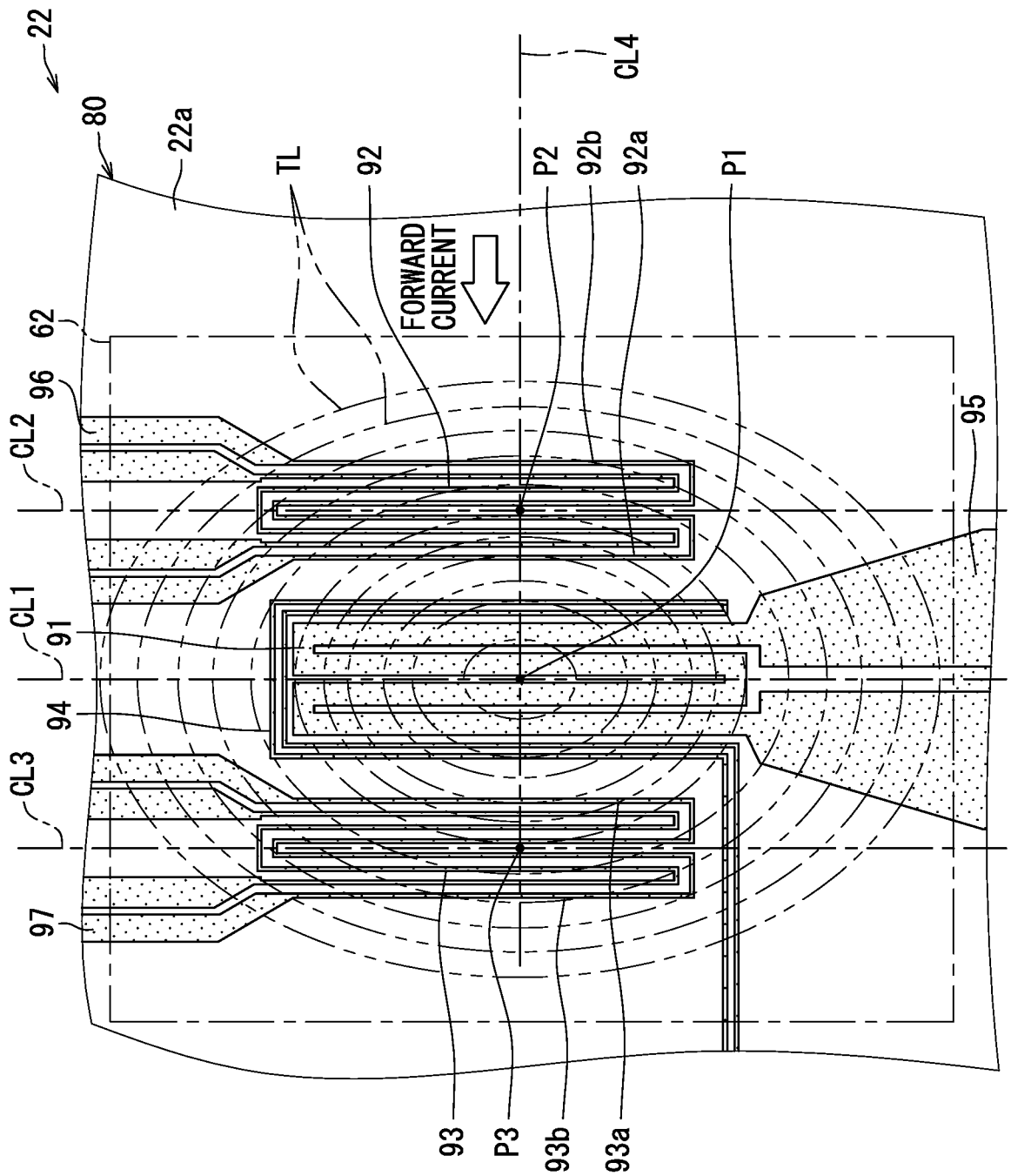
FIG. 10 is a view showing isotherms at a membrane portion.

As shown in FIG. 10, when heat is generated from the heat generating resistor 91, the heat is radially transmitted from the heat generating resistor 91 to the sensor film portion 80. When a temperature distribution in the sensor film portion 80 is shown by an isotherm TL, the easier the heat is transferred to the sensor film portion 80, the less a temperature difference occurs in the sensor film portion 80, and an interval between the isotherm TL in the sensor film portion 80 becomes smaller. Regarding the heat extending the sensor film portion 80 in the depth direction Z, the amount of heat Q transmitted through the center of the isotherm TL and along a virtual isotherm center line CL4 extending in the depth direction Z tends to increase most.

Figure 11:
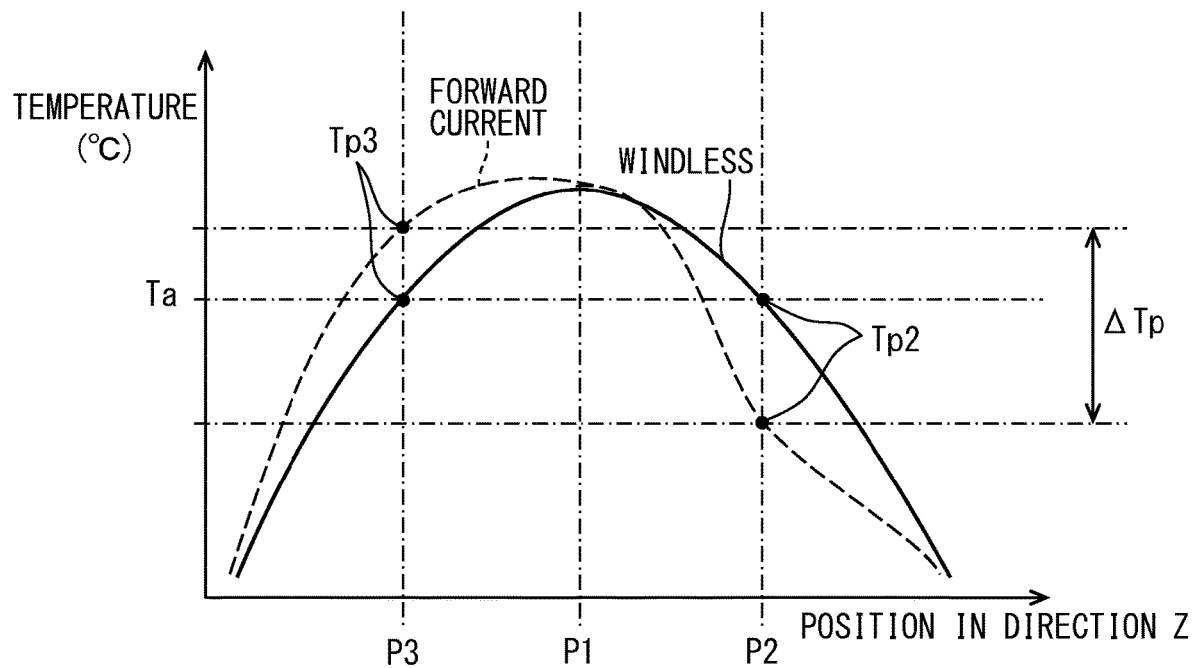
FIG. 11 is a view showing a temperature distribution in a membrane portion.

When there is no air flow in the measurement flow path 32 and there is no wind, as shown by a solid line in FIG. 11, in a temperature distribution in a portion where the isotherm center line CL4 passes in the sensor film portion 80, a temperature at a heat generating position P1, which is a position intersecting the center line CL1 of the heat generating resistor 91, is the highest. In the temperature distribution, the temperature of the sensor film portion 80 gradually decreases from the heat generating position P1 toward the mold upstream and the mold downstream in the depth direction Z In addition, in the temperature distribution, an upstream temperature measuring position P2, which is a position intersecting the center line CL2 of the upstream temperature measuring resistor 92, and a downstream temperature measuring position P3, which is a position intersecting the center line CL3 of the downstream temperature measuring resistor 93, are at the same temperature. When a temperature at the upstream temperature measuring position P2 is referred to as an upstream temperature Tp2 and a temperature at the downstream temperature measuring position P3 is referred to as a downstream temperature Tp3, the upstream temperature Tp2 and the downstream temperature Tp3 are, for example, a reference temperature Ta.

On the other hand, when air flows in the measurement flow path 32 from the measuring inlet 35 to the measuring outlet 36 and there is a forward current wind, heat from the heat generating resistor 91 is less likely to be transmitted to the upstream temperature measuring resistor 92 on the windward side and more likely to be transmitted to the downstream temperature measuring resistor 93 on the leeward side. In this case, as shown by the broken line in FIG. 11, the temperature distribution in a portion where the isotherm center line CL4 passes changes in the sensor film portion 80, and the upstream temperature measuring position P2 becomes lower than the reference temperature Ta, and the downstream temperature measuring position P3 becomes higher than the reference temperature Ta.

The flow rate measurement circuit computes a value obtained by subtracting the downstream temperature Tp3 from the upstream temperature Tp2 as a temperature difference $\Delta Tp$ between the upstream temperature measuring position P2 and the downstream temperature measuring position P3, and measures the air flow rate and the direction of the flow by using the temperature difference $\Delta Tp$. The flow rate measurement circuit sets the measured flow rate to zero, for example, when the temperature difference $\Delta Tp$ is zero, assuming that no air flow has occurred. In addition, in the flow rate measurement circuit, the larger the temperature difference $\Delta Tp$, the larger the measured flow rate. Further, when the temperature difference $\Delta Tp$ is a negative value, the flow rate measurement circuit assumes that there is a backflow of air flowing from the measuring outlet 36 toward the measuring inlet 35.

Figure 12:
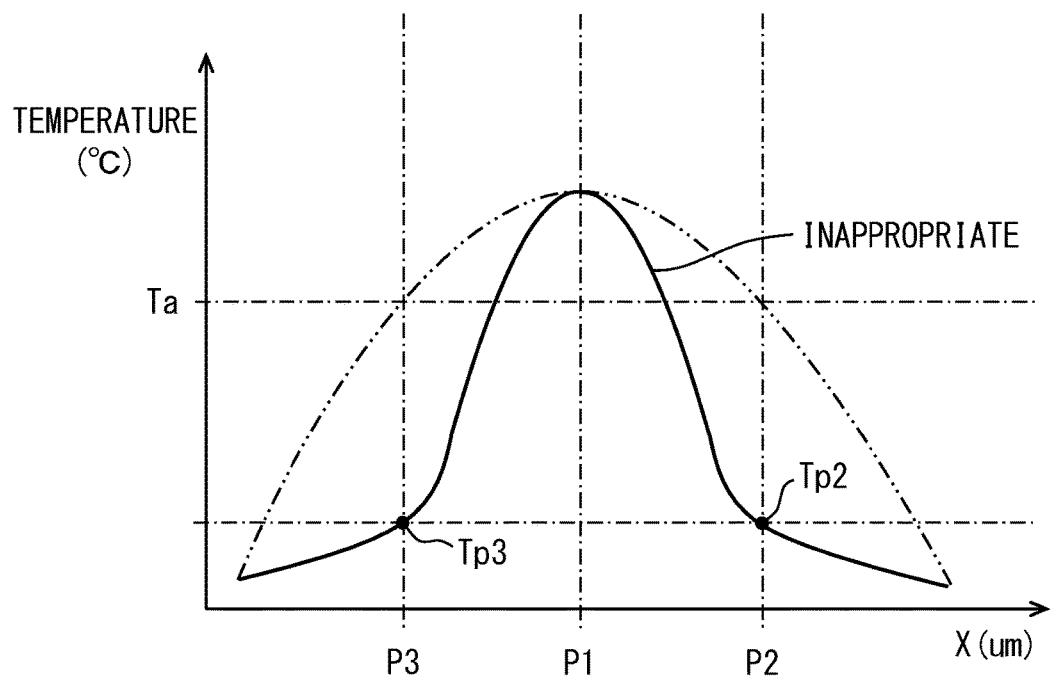
FIG. 12 is a view showing a temperature distribution when an upstream temperature and a downstream temperature are too low in a membrane portion.
Figure 13:
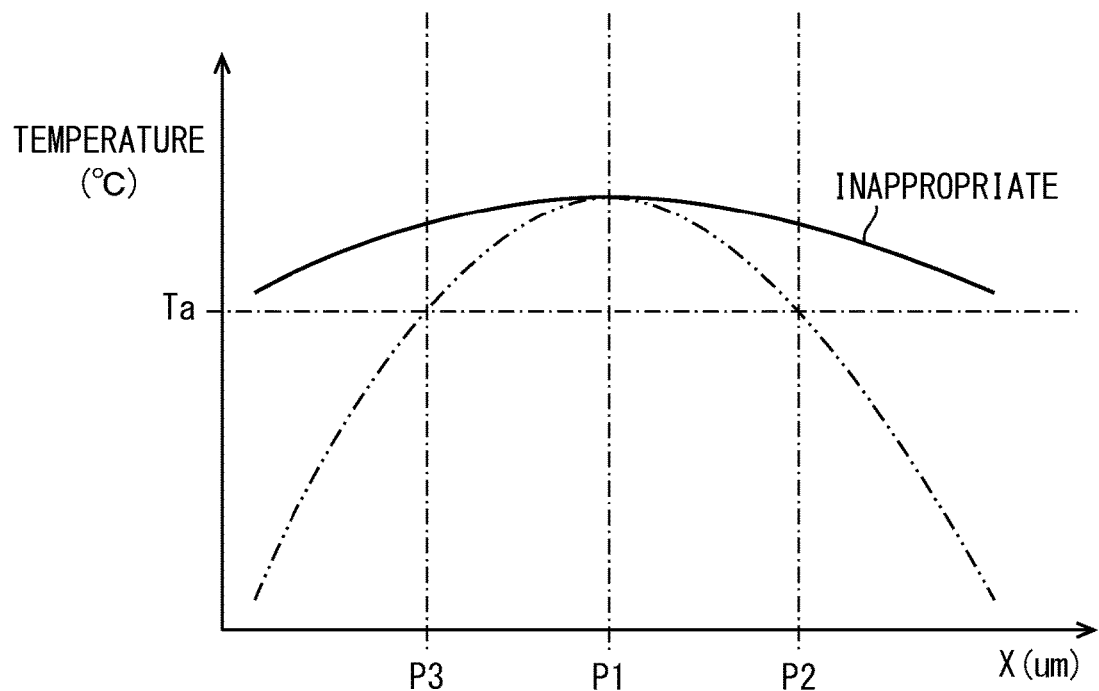
FIG. 13 is a view showing a temperature distribution when an upstream temperature and a downstream temperature are too high in a membrane portion.

In the flow rate measurement circuit, the smaller the temperature difference $\Delta Tp$, the larger a ratio of an error to the temperature difference $\Delta Tp$, and the flow rate measurement accuracy decreases. In other words, the larger the temperature difference $\Delta Tp$, the higher the flow rate measurement accuracy. In the flow sensor 22, the temperature difference $\Delta Tp$ tends to increase as the upstream temperature Tp2 and the downstream temperature Tp3 in a windless state are not too small and not too large and are closer to the reference temperature Ta, which is an appropriate temperature. For example, as shown by the solid line as unsuitable in FIG. 12, when both the upstream temperature Tp2 and the downstream temperature Tp3 are very low compared to the reference temperature Ta, the temperature does not easily change at the temperature measuring positions P2 and P3, and the temperature difference $\Delta Tp$ tends to be insufficient even when the air flow occurs. In addition, as shown by the solid line as unsuitable in FIG. 13, when both the upstream temperature Tp2 and the downstream temperature Tp3 are very high compared to the reference temperature Ta, the temperature does not easily change at the temperature measuring positions P2 and P3, and the temperature difference $\Delta Tp$ tends to be insufficient even when the air flow occurs.

$$240 < LH \times t1 \times (LM1 - LM2 + 1) < 2400 \quad \text{Expression 1}$$

$$LM1 \geq LM2 \quad \text{Expression 2}$$

In the present embodiment, based on the knowledge that the temperature difference $\Delta Tp$ can be increased by appropriately defining a relationship between the cross-sectional area S of the heat generating resistor 91 and the shapes and sizes of the temperature measuring resistors 92 and 93, a relationship of Expression 1 and Expression 2 is satisfied in the flow sensor 22. Regarding Expression 1, $LH \times t1 \times (LM1 - LM2 + 1)$ is referred to as a first membrane value MV1. The first membrane value MV1 is a value showing the relationship between the heat generating resistor 91 and the temperature measuring resistors 92 and 93 in the membrane portion 62 regarding the position, shape, size, and the like.

Figure 14:
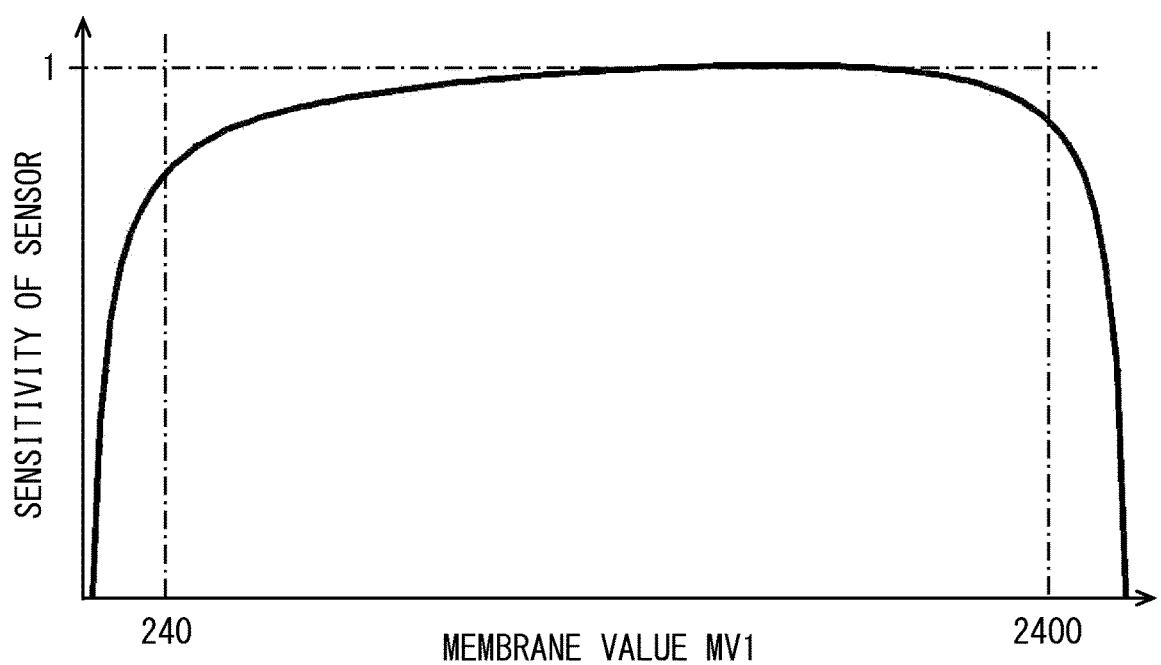
FIG. 14 is a view showing a relationship between a first membrane value and a sensor sensitivity.

Regarding a relationship between the first membrane value MV1 and the sensitivity of the flow sensor 22, the relationship as shown in FIG. 14 is acquired by a test or the like. In FIG. 14, the first membrane value MV1 is a value near "1" showing that the sensor sensitivity is sufficiently high in a range larger than "240" and smaller than "2400". On the other hand, when the first membrane value MV1 becomes "240" or less, the sensor sensitivity sharply decreases. In addition, when the first membrane value MV1 becomes "2400" or more, the sensor sensitivity sharply decreases.

$$1.4 < LH \times t \times (LM1 - LM2 + 1)/W1 < 20 \quad \text{Expression 3}$$

Further, in addition to the Expressions 1 and 2, the relationship of the above-described Expression 3 is satisfied. The content described above is based on the knowledge that the temperature difference $\Delta Tp$ can be increased by appropriately defining the relationship between the cross-sectional area S of the heat generating resistor 91, the shapes and sizes of the temperature measuring resistors 92 and 93, and the sizes of the temperature measuring resistors 92 and 93. Regarding Expression 3, $LH \times t \times (LM1 - LM2 + 1)/W1$ is referred to as a second membrane value MV2. The second membrane value MV2 is a value obtained by dividing the first membrane value MV1 by the width dimension W1 of the temperature measuring resistors 92 and 93.

Regarding the relationship between the second membrane value MV2 and the sensitivity of the flow sensor 22, a relationship that the sensor sensitivity is sufficiently high in a range where the second membrane value MV2 is larger than "1.4" and smaller than "20" is acquired by a test or the like. In the relationship, when the second membrane value MV2 becomes "1.4" or less, the sensor sensitivity sharply decreases, and when the second membrane value MV2 becomes "20" or more, the sensor sensitivity sharply decreases.

According to the present embodiment described above, in the flow sensor 22, the relationship between the sizes and shapes of the temperature measuring resistors 92 and 93 and the size of the heat generating resistor 91 is defined by Expressions 1 and 2. In the configuration, the heat generating resistor 91 is not too large and not too small with respect to the length dimensions LM1 and LM2 of the temperature measuring resistors 92 and 93, and has an appropriate size. Therefore, when the sensor film portion 80 is heated by the heat generating resistor 91, the temperature distribution in the sensor film portion 80 tends to be an appropriate aspect for the temperature measurement by the temperature measuring resistors 92 and 93. As described above, by improving the measurement accuracy of the temperature measuring resistors 92 and 93, it is possible to improve the measurement accuracy of the flow rate by the air flow meter 20.

According to the present embodiment, in the flow sensor 22, the relationship between the sizes and shapes of the temperature measuring resistors 92 and 93 and the size of the heat generating resistor 91 is defined by Expression 3 in addition to Expressions 1 and 2. In the configuration, the heat generating resistor 91 is not too large and not too small with respect to both the length dimensions LM1 and LM2, and the width dimension W1 of the temperature measuring resistors 92 and 93, and has an appropriate size. Therefore, the temperature distribution in the sensor film portion 80 tends to be more appropriate aspect for the temperature measurement by the temperature measuring resistors 92 and 93. Accordingly, the measurement accuracy of the flow rate by the air flow meter 20 can be further improved.

According to the present embodiment, the thermal conductivity of the temperature measuring resistors 92 and 93 is 60 [W/mK] or more. With the configuration, when the thermal conductivity of the temperature measuring resistors 92 and 93 is 60 [W/mK] or more, the temperature distribution in the sensor film portion 80 can be optimized by using the knowledge that the upstream temperature Tp2 and the downstream temperature Tp3 tends to be close to the reference temperature Ta due to the heat generation of the heat generating resistor 91. In this case, since the temperature difference between the measured temperature of the upstream temperature measuring resistor 92 and the measured temperature of the downstream temperature measuring resistor 93 tends to increase, the measured accuracy of the flow sensor 22 can be improved by the thermal conductivity of the temperature measuring resistors 92 and 93.

According to the present embodiment, in the sensor film portion 80, the heat generating resistor 91 and the temperature measuring resistors 92 and 93 are covered with the insulating layer 81, the protective layer 83, and the cover layer 84. Therefore, even when foreign matter such as dust comes into contact with the sensor film portion 80 in the measurement flow path 32, it is possible to restrict the operating accuracy of the heat generating resistor 91 and the temperature measuring resistors 92 and 93 from being decreased by the foreign matter.

According to the present embodiment, each thermal conductivity of the insulating layer 81, the protective layer 83, and the cover layer 84 is smaller than ½ of the thermal conductivity of the conductive layer 82. In the configuration, when each of the thermal conductivities of the insulating layer 81, the protective layer 83, and the cover layer 84 is smaller than ½ of the thermal conductivity of the conductive layer 82, the temperature distribution can be optimized by using the knowledge that the upstream temperature Tp2 and the downstream temperature Tp3 tend to be close to the reference temperature Ta. In this case, the measurement accuracy of the flow sensor 22 can be improved by the respective thermal conductivity of the insulating layer 81, the protective layer 83, and the cover layer 84.

According to the present embodiment, the insulating layer 81, the protective layer 83, and the cover layer 84 are provided to include at least one of silicon nitride and silicon oxide. In the configuration, when the insulating layer 81, the protective layer 83, and the cover layer 84 include at least one of silicon nitride and silicon oxide, the temperature distribution can be optimized by using the knowledge that the upstream temperature Tp2 and the downstream temperature Tp3 tend to be close to the reference temperature Ta. In this case, the measurement accuracy of the flow sensor 22 can be improved by the silicon nitride or silicon oxide contained in the insulating layer 81, the protective layer 83, and the cover layer 84.

According to the present embodiment, the thickness dimension t1 of the heat generating resistor 91 is ½ or less of the thickness dimension t2 of the sensor film portion 80. In the configuration, when the thickness dimension t1 of the heat generating resistor 91 is ½ or less of the thickness dimension t2 of the sensor film portion 80, the temperature distribution can be optimized using the knowledge that the upstream temperature Tp2 and the downstream temperature Tp3 tend to be close to the reference temperature Ta. In this case, the measurement accuracy of the flow sensor 22 can be improved by the relationship between the thickness dimension t1 of the heat generating resistor 91 and the thickness dimension t2 of the sensor film portion 80.

According to the present embodiment, the thickness dimension t1 of the heat generating resistor 91 is smaller than both the width dimension W1 of the temperature measuring resistors 92 and 93 and the width dimension W3 of the heat generating resistor 91. In the configuration, since the thickness dimension t1 of the heat generating resistor 91 is sufficiently small, even when the amount of heat Q generated from the heat generating resistor 91 is reduced as much as possible, the temperature distribution in the sensor film portion 80 can be set to an appropriate state. Therefore, the electric power for generating heat of the heat generating resistor 91 can be reduced, and as a result, energy saving in the air flow meter 20 can be realized.

According to the present embodiment, the temperature measuring resistors 92 and 93 are provided to contain at least one of polycrystalline silicon, single crystal silicon, platinum, tungsten, copper, molybdenum, and nickel. In the configuration, when the temperature measuring resistors 92 and 93 have at least one of polycrystalline silicon, single crystal silicon, platinum, tungsten, copper, molybdenum, and nickel, the temperature distribution can be optimized using the knowledge that the temperatures Tp2 and Tp3 tend to be close to the reference temperature Ta. In this case, the measurement accuracy of the flow sensor 22 can be improved by the polycrystalline silicon, single crystal silicon, platinum, tungsten, copper, molybdenum and nickel contained in the temperature measuring resistors 92 and 93.

Second Embodiment

In the first embodiment, in the temperature measuring resistors 92 and 93, the inner edge portions 92a and 93a and the outer edge portions 92b and 93b have the same length, but in the second embodiment, the outer edge portions 92b and 93b are shorter than the inner edge portions 92a and 93a. In the present embodiment, the components having the same reference numerals as the drawings in the first embodiment and the configurations not described are the same as those in the first embodiment, and have the same effects. In the present embodiment, the differences from the first embodiment will be mainly described.

Figure 15:
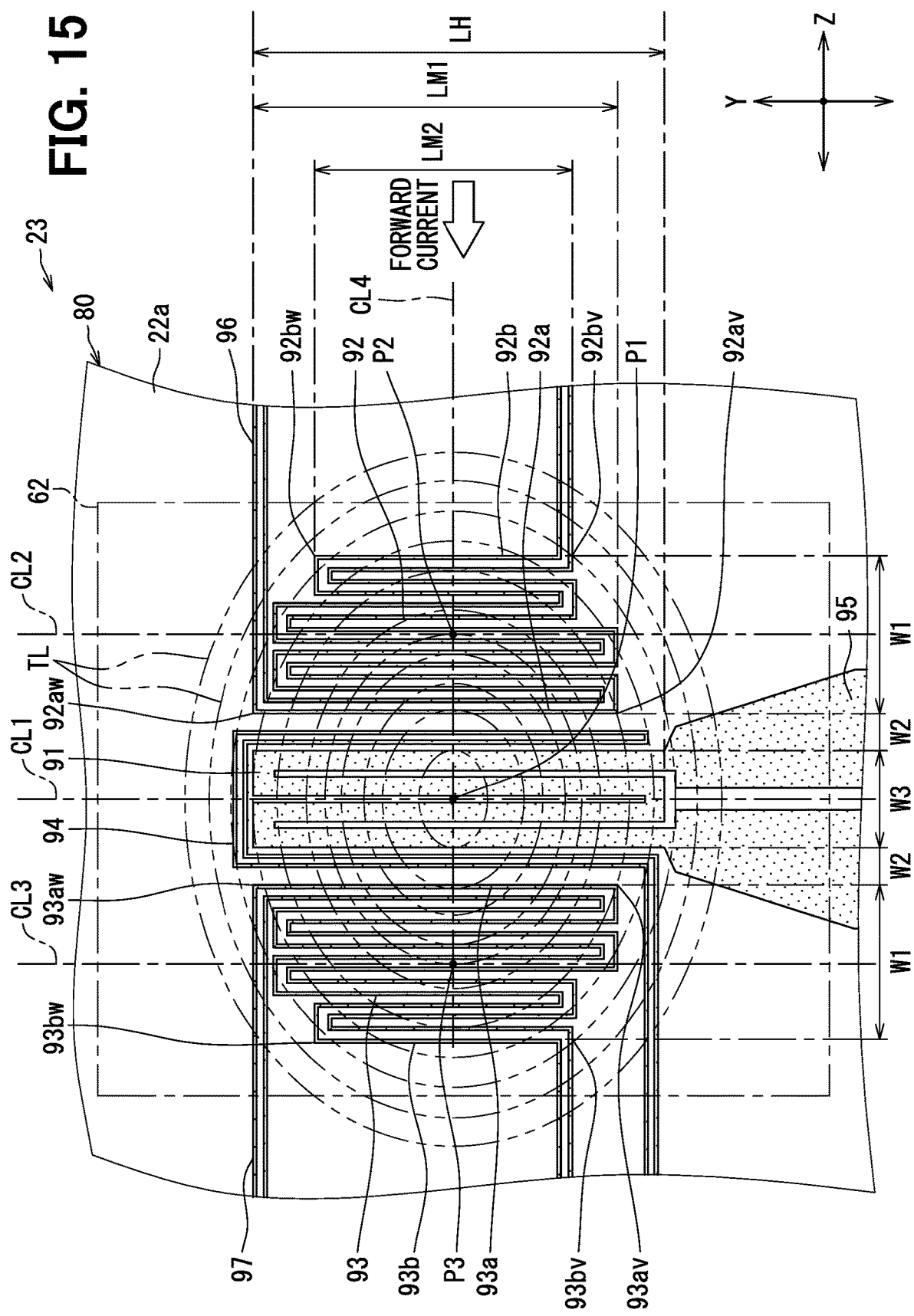
FIG. 15 is a diagram showing a wiring pattern in a membrane portion in a second embodiment.

As shown in FIG. 15, in the temperature measuring resistors 92 and 93, the length dimension LM1 of the outer edge portions 92b and 93b is smaller than the length dimension LM2 of the inner edge portions 92a and 93a. That is, the relationship of LM1<LM2 is established. Similar to the first embodiment, the center of the upstream temperature measuring resistor 92 and the center of the downstream temperature measuring resistor 93 are disposed at positions aligned in the height direction Y. Therefore, end portions 92bv and 93bv in the side of front end, which are the end portions in the side of the mold front end in the outer edge portions 92b and 93b, are disposed closer to the side of the mold base end than end portions 92av and 93av in the side of mold front end, which are the end portions in the side of the mold base end in the inner edge portions 92a and 93a. Similarly, end portions 92bw and 93bw in the side of base end, which are the end portions in the side of the mold base end in the outer edge portions 92b and 93b, are disposed closer to the side of the mold front end than end portions 92*aw* and 93*aw* in the side of base end, which are the end portions in the side of the mold base end in the inner edge portions 92*a* and 93*a*.

As described above, in the present embodiment, the outer edge portions 92*b* and 93*b* are provided at positions spaced inwardly in the height direction Y from the end portions 92*av* and 93*av* in the side of front end of the inner edge portions 92*a* and 93*a* and the end portions 92*aw* and 93*aw* in the side of base end. In the upstream temperature measuring resistor 92, the end portion 92*av* in the side of front end and the end portion 92*aw* in the side of base end of the inner edge portion 92*a* correspond to the both end portion. In addition, in the downstream temperature measuring resistor 93, the end portion 93*av* in the side of front end and the end portion 93*aw* in the side of base end of the inner edge portion 93*a* correspond to the both end portion.

In the configuration, when the isotherm TL is generated due to heat generation of the heat generating resistor 91, in the upstream temperature measuring resistor 92, the end portion 92*av* in the side of front end of the inner edge portion 92*a* and the end portion 92*bv* in the side of front end of the outer edge portion 92*b* are easily arranged along the isotherm TL. Therefore, a temperature difference between the end portions 92*av* and 92*bv* in the side of front end tends to be small, and as a result, a temperature difference between the end portions 92*av* and 92*bv* in the side of front end and the upstream temperature measuring position P2 is reduced. Similarly, on the side of the mold base end, the end portion 92*aw* in the side of base end of the inner edge portion 92*a* and the end portion 92*bw* in the side of base end of the outer edge portion 92*b* are easily arranged along the isotherm TL. Therefore, a temperature difference between the end portion 92*aw* and 92*bw* in the side of base end tends to be small, and as a result, a temperature difference between the end portion 92*aw* and 92*bw* in the side of base end and the upstream temperature measuring position P2 is reduced. Therefore, in the upstream temperature measuring resistor 92, the temperature difference for each portion becomes as small as possible, and the temperature measurement accuracy by the upstream temperature measuring resistor 92 can be easily improved.

Similarly, in the downstream temperature measuring resistor 93, the end portion 93*av* in the side of front end of the inner edge portion 93*a* and the end portion 93*bv* in the side of front end of the outer edge portion 93*b* are easily arranged along the isotherm TL. Therefore, a temperature difference between the end portion 93*av* and 93*bv* in the side of front end tends to be small, and as a result, a temperature difference between the end portion 93*av* and 93*bv* in the side of front end and the downstream temperature measuring position P3 is reduced. Similarly, on the side of the mold base end, the end portion 93*aw* in the side of base end of the inner edge portion 93*a* and the end portion 93*bw* in the side of base end of the outer edge portion 93*b* are easily arranged along the isotherm TL. Therefore, a temperature difference between the end portion 93*aw* and 93*bw* in the side of base end tends to be small, and as a result, a temperature difference between the end portion 93*aw* and 93*bw* in the side of base end and the downstream temperature measuring position P3 is reduced. Therefore, in the downstream temperature measuring resistor 93, the temperature difference for each portion becomes as small as possible, and the temperature measurement accuracy by the downstream temperature measuring resistor 93 can be easily improved.

In the temperature measuring resistors 92 and 93, the inner edge portions 92*a* and 93*a* are included in the longest portion in the height direction Y. In addition, the outer edge portions 92*b* and 93*b* are included in the shortest portion in the height direction Y. Further, the width dimension W1 of the temperature measuring resistors 92 and 93 is larger than the width dimension W3 of the heat generating resistor 91.

In the present embodiment, the upstream temperature measuring wiring 96 extends from the upstream temperature measuring resistor 92 toward the side of the mold upstream in the depth direction Z. On the other hand, the downstream temperature measuring wiring 97 extends from the downstream temperature measuring resistor 93 toward the side of the mold downstream in the depth direction Z According to the present embodiment, in the temperature measuring resistors 92 and 93, the outer edge portions 92*b* and 93*b* are provided at positions spaced inwardly in the height direction Y from the end portions 92*av* and 93*av* in the side of front end of the inner edge portions 92*a* and 93*a* and the end portions 92*aw* and 93*aw* in the side of base end. In the configuration, the end portions 92*bv* and 93*bv* in the side of front end of the outer edge portions 92*b* and 93*b* and the end portions 92*av* and 93*av* in the side of front end of the inner edge portions 92*a* and 93*a* are easily arranged along the isotherm TL. Similarly, the end portions 92*bw* and 93*bw* in the side of base end of the outer edge portions 92*b* and 93*b* and the end portion 92*aw* and 93*aw* in the side of base end of the inner edge portions 92*a* and 93*a* are easily arranged along the isotherm TL. In this case, since the difference in temperature between the portions is unlikely to be large in the temperature measuring resistors 92 and 93, the temperature measurement accuracy by the temperature measuring resistors 92 and 93 can be improved. As a result, the measurement accuracy of the flow rate by the air flow meter 20 can be improved.

Other Embodiments

While multiple embodiments according to the present disclosure have been described above, the present disclosure is not limited to the above embodiments, and may be applied to various embodiments and combinations without departing from the scope of the present disclosure.

As a modification example 1, the heat generating resistor 91 and the temperature measuring resistors 92 and 93 may be arranged not in a direction in which their long sides extend in parallel but in a direction in which their short sides extend in parallel. Further, one short side and another long side of the heat generating resistor 91 and the temperature measuring resistors 92 and 93 may be arranged in a direction extending in parallel.

As a modification example 2, the upstream temperature measuring resistor 92 and the downstream temperature measuring resistor 93 may be disposed at positions shifted in the height direction Y. Further, a center of the heat generating resistor 91 and a center of the temperature measuring resistors 92 and 93 may be provided at positions arranged with each other in the height direction Y.

As a modification example 3, the upstream temperature measuring resistor 92 and the downstream temperature measuring resistor 93 may be different in size and shape from each other. For example, in the upstream temperature measuring resistor 92 and the downstream temperature measuring resistor 93, the length dimensions LM1 of the inner edge portions 92*a* and 93*a* may be different from each other, the length dimensions LM2 of the outer edge portions 92*b* and 93*b* may be different from each other, and the width dimensions W1 may be different from each other.

As a modification example 4, the flow sensor 22 may have multiple upstream temperature measuring resistors 92, or may have multiple downstream temperature measuring resistors 93. In addition, in the flow sensor 22, the temperature measurement portion such as the temperature measuring resistors 92 and 93 and the heater portion such as the heat generating resistor 91 may be arranged in the height direction Y. Further, the flow sensor 22 may have only one of the upstream temperature measuring resistor 92 and the downstream temperature measuring resistor 93.

As a modification example 5, at least a part of the temperature measurement portion such as the temperature measuring resistors 92 and 93 and at least a part of the heater portion such as the heat generating resistor 91 may protrude outwardly from the membrane portion 62. That is, it is not necessary that the temperature measurement portion and the heater portion are all provided in the membrane portion 62.

As a modification example 6, when the length dimension of the temperature measuring resistors 92 and 93 in the height direction Y is gradually shortened at a position farther from the heat generating resistor 91 in the depth direction Z, it may be shortened stepwise or may be continuously shortened. In any case, the length dimension LM2 of the outer edge portions 92b and 93b of the temperature measuring resistors 92 and 93 may be smaller than the length dimension LM1 of the inner edge portions 92a and 93a. As described above, as long as the relationship of LM2<LM1 is established, at least one of Expression 1 and Expression 2 does not have to be established.

As a modification example 7, the long and short sides of the heat generating resistor 91 and the temperature measuring resistors 92 and 93 do not extend straight in the height direction Y or the depth direction Z, but may be bent inwardly or outwardly. Even in this case, it is preferable that the length dimension and the width dimension of the heat generating resistor 91 and the temperature measuring resistors 92 and 93 are the dimensions in the depth direction Z and the height direction Y.

As a modification example 8, in the sensor film portion 80, the film base portion covering the heat generating resistor 91, the upstream temperature measuring resistor 92, and the downstream temperature measuring resistor 93 may have a single-layer structure, a two-layer structure, or a four-layer or more structure. For example, the protective layer 83 and the cover layer 84 are provided between the insulating layer 81 and the conductive layer 82 in addition to the side opposite to the sensor substrate 70 via the resistors 91 to 93.

What is claimed is:

1. A flow rate measuring device configured to measure a flow rate of fluid, the device comprising:
    a measurement flow path configured to conduct the fluid therethrough; and
    a flow sensor configured to measure the flow rate of the fluid in the measurement flow path, wherein
    the flow sensor includes
    a sensor substrate having one surface and
    a film-shaped sensor film portion overlaid on the one surface of the sensor substrate, wherein
    the sensor film portion includes
    a heater portion configured to heat the sensor film portion and
    a temperature measurement portion arranged in the heater portion along the one surface and configured to measure a temperature of the sensor film portion,
    an orthogonal direction is orthogonal to both a thickness direction of the sensor film portion and an arrangement direction of the heater portion and the temperature measurement portion,
    a length dimension of the heater portion in the orthogonal direction is LH,
    a length dimension of an inner edge portion which is an edge portion of the temperature measurement portion on a heater portion side in the orthogonal direction is LM1,
    a length dimension of an outer edge portion which is an edge portion of the temperature measurement portion on a side opposite to the heater portion in the orthogonal direction, is LM2, and
    a thickness dimension of the heater portion in the thickness direction is t1, and
    relationships of Expression 1 and Expression 2 are satisfied, $$240 < LH \times t1 \times (LM1 - LM2 + 1) < 2400, \text{ and} \quad \text{Expression 1:}$$

$$LM1 \geq LM2. \quad \text{Expression 2:}$$

2. The flow rate measuring device according to claim 1, wherein
    a width dimension of the temperature measurement portions in the arrangement direction is W1, and
    a relationship of Expression 3 is satisfied, $$1.4 < LH \times t \times (LM1 - LM2 + 1)/W1 < 20. \quad \text{Expression 3}$$

3. The flow rate measuring device according to claim 1, wherein
    a thermal conductivity of the temperature measurement portions is 60 [W/mK] or more.

4. The flow rate measuring device according to claim 1, wherein
    the sensor film portion includes a film base portion that covers the heater portion and the temperature measurement portion.

5. The flow rate measuring device according to claim 4, wherein
    a thermal conductivity of the film base portion is ½ or less of a thermal conductivity of the temperature measurement portion.

6. The flow rate measuring device according to claim 4, wherein
    the film base portion is provided to include at least one of silicon nitride and silicon oxide.

7. The flow rate measuring device according to claim 1, wherein
    the thickness dimension of the heater portion is ½ or less of a thickness dimension of the sensor film portion in the thickness direction.

8. The flow rate measuring device according to claim 1, wherein
    the thickness dimension of the heater portion is smaller than both a width dimension of the temperature measurement portions in the arrangement direction and a width dimension of the heater portion in the arrangement direction.

9. The flow rate measuring device according to claim 1, wherein
    the temperature measurement portion includes at least one of polycrystalline silicon, single crystal silicon, platinum, tungsten, copper, molybdenum, or nickel.

10. The flow rate measuring device according to claim 1, wherein
    the outer edge portion is provided at positions spaced inwardly in the orthogonal direction from both end portions of the inner edge portions.

* * * * *